(12) United States Patent
Leclair et al.

(10) Patent No.: US 12,055,208 B2
(45) Date of Patent: Aug. 6, 2024

(54) AIR INTAKE SYSTEM FOR AN OFF-ROAD VEHICLE

(71) Applicant: BOMBARDIER RECREATIONAL PRODUCTS INC., Valcourt (CA)

(72) Inventors: Alexandre Leclair, Orford (CA); Dave Proulx, Sherbrooke (CA); Pascal Toupin, Sherbrooke (CA); Mathieu Duquette, Sherbrooke (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 0 days.

(21) Appl. No.: 17/844,597

(22) Filed: Jun. 20, 2022

(65) Prior Publication Data

US 2022/0316579 A1   Oct. 6, 2022

Related U.S. Application Data

(62) Division of application No. 16/096,926, filed as application No. PCT/IB2017/052485 on Apr. 28, 2017, now Pat. No. 11,391,361.
(Continued)

(51) Int. Cl.
*F16H 57/04*      (2010.01)
*B60K 11/06*      (2006.01)
(Continued)

(52) U.S. Cl.
CPC .......... *F16H 57/0416* (2013.01); *B60K 11/06* (2013.01); *B60K 13/02* (2013.01);
(Continued)

(58) Field of Classification Search
CPC ........... F02M 35/024; F02M 35/10013; F02M 35/02; F02M 35/0201; F02M 35/044;
(Continued)

(56) References Cited

U.S. PATENT DOCUMENTS

| 2,143,889 | A | 1/1939 | Ledwinka |
| 4,596,537 | A | 6/1986 | Te-Long |

(Continued)

FOREIGN PATENT DOCUMENTS

| CN | 1321828 A | 11/2001 |
| CN | 1896490 A | 1/2007 |

(Continued)

OTHER PUBLICATIONS

English translation of CN1321828A retrieved from https://patents.google.com/patent/CN1321828A/en?oq=cn1321828 on Jul. 28, 2021.
(Continued)

*Primary Examiner* — Emma K Frick
(74) *Attorney, Agent, or Firm* — BCF LLP

(57) ABSTRACT

A filter housing has a first aperture, a tube connected to and extending from the first aperture, at least one second aperture, and at least one filter connected to the at least one second aperture for filtering air entering the at least one second aperture. A portion of air entering the filter housing flows out of the filter housing via the first aperture and through the tube. Another portion of air entering the filter housing flows out of the filter housing via the at least one second aperture around the tube separately from the portion of air flowing out of the filter housing via the first aperture.

20 Claims, 36 Drawing Sheets

Related U.S. Application Data

(60) Provisional application No. 62/328,893, filed on Apr. 28, 2016.

(51) Int. Cl.

| | | |
|---|---|---|
| B60K 13/02 | (2006.01) | |
| F02M 35/02 | (2006.01) | |
| F02M 35/024 | (2006.01) | |
| F02M 35/16 | (2006.01) | |
| F16H 57/027 | (2012.01) | |
| B60K 5/00 | (2006.01) | |

(52) U.S. Cl.
CPC ........ *F02M 35/024* (2013.01); *F02M 35/162* (2013.01); *F16H 57/027* (2013.01); *F16H 57/0489* (2013.01); *B60K 2005/003* (2013.01); *B60Y 2200/124* (2013.01); *B60Y 2200/20* (2013.01); *F02M 35/0201* (2013.01)

(58) Field of Classification Search
CPC ...... F02M 35/06; F02M 35/04; F02M 35/048; F01P 11/12
See application file for complete search history.

(56) References Cited

U.S. PATENT DOCUMENTS

| | | | |
|---|---|---|---|
| 4,632,070 A | 12/1986 | Onda et al. | |
| 4,733,639 A | 3/1988 | Kohyama et al. | |
| 4,848,294 A | 7/1989 | Yamamoto | |
| 4,890,586 A | 1/1990 | Fujii et al. | |
| 5,086,858 A | 2/1992 | Mizuta et al. | |
| 5,251,713 A | 10/1993 | Enokimoto | |
| 5,490,573 A * | 2/1996 | Hagiwara | F02M 35/10013 180/219 |
| 5,958,096 A * | 9/1999 | Yee | B01D 46/0002 55/517 |
| 5,976,044 A | 11/1999 | Kuyama | |
| 6,395,049 B2 * | 5/2002 | Knodler | F02M 35/10196 55/497 |
| 6,691,665 B2 * | 2/2004 | Gray | F02M 35/10045 123/192.1 |
| 6,761,748 B2 | 7/2004 | Schenk et al. | |
| 6,848,528 B2 | 2/2005 | Pichler et al. | |
| 7,051,824 B1 | 5/2006 | Jones et al. | |
| 7,066,135 B2 * | 6/2006 | Ishikawa | F02M 35/10072 123/579 |
| 7,290,519 B2 | 11/2007 | Ohba et al. | |
| 7,363,999 B2 | 4/2008 | Hastings | |
| 7,427,248 B2 | 9/2008 | Chonan | |
| 7,493,881 B2 | 2/2009 | Smith et al. | |
| 7,686,123 B2 | 3/2010 | Ishida | |
| 7,717,974 B2 * | 5/2010 | Diepolder | F02M 35/1019 55/DIG. 28 |
| 7,789,924 B2 * | 9/2010 | Waltenberg | B60R 21/34 55/495 |
| 7,857,881 B2 * | 12/2010 | Sato | F02M 35/10196 123/184.32 |
| 8,127,878 B2 * | 3/2012 | Teraguchi | B60K 13/02 180/68.1 |
| 8,147,578 B2 * | 4/2012 | Bannister | B01D 46/2411 55/498 |
| 8,256,563 B2 | 9/2012 | Suzuki et al. | |
| 8,272,685 B2 | 9/2012 | Lucas et al. | |
| 8,381,855 B2 | 2/2013 | Suzuki et al. | |
| 8,439,019 B1 | 5/2013 | Carlson et al. | |
| 8,439,141 B2 | 5/2013 | Bessho et al. | |
| 8,459,397 B2 | 6/2013 | Bessho et al. | |
| 8,561,403 B2 | 10/2013 | Vandyne et al. | |
| 8,784,522 B2 * | 7/2014 | Menssen | B01D 50/20 55/497 |
| 8,833,326 B2 * | 9/2014 | Koyama | F02M 35/162 123/184.57 |
| 8,834,307 B2 | 9/2014 | Itoo et al. | |
| 8,875,830 B2 | 11/2014 | Massicotte et al. | |
| 8,960,348 B2 | 2/2015 | Shomura et al. | |
| 9,127,625 B2 * | 9/2015 | Kaiser | B01D 46/10 |
| 9,687,768 B2 * | 6/2017 | Wagner | B01D 46/0002 |
| 10,001,092 B2 * | 6/2018 | Soeda | F02M 35/162 |
| 10,054,086 B2 * | 8/2018 | Bursch | F02M 35/021 |
| 10,087,828 B2 | 10/2018 | Okita | |
| 10,337,474 B1 | 7/2019 | Wilson et al. | |
| 11,359,555 B1 * | 6/2022 | Reichardt | B63H 20/00 |
| 2003/0066696 A1 | 4/2003 | Nakamura | |
| 2004/0188159 A1 | 9/2004 | Yatagai et al. | |
| 2004/0195797 A1 | 10/2004 | Nash et al. | |
| 2005/0173180 A1 | 8/2005 | Hypes et al. | |
| 2006/0270503 A1 | 11/2006 | Suzuki et al. | |
| 2007/0251744 A1 | 11/2007 | Matsuzawa | |
| 2008/0308337 A1 | 12/2008 | Ishida | |
| 2012/0055729 A1 | 3/2012 | Bessho et al. | |
| 2012/0283930 A1 | 11/2012 | Venton-Walters et al. | |
| 2015/0259011 A1 | 9/2015 | Deckard et al. | |
| 2017/0166255 A1 | 6/2017 | Peterson et al. | |
| 2020/0208731 A1 | 7/2020 | Matsudo | |

FOREIGN PATENT DOCUMENTS

| | | |
|---|---|---|
| CN | 1907797 A | 2/2007 |
| CN | 1982109 A | 6/2007 |
| CN | 101318458 A | 12/2008 |
| CN | 102733929 A | 10/2012 |
| CN | 104343944 A | 2/2015 |
| CN | 105082985 A | 11/2015 |
| CN | 105298613 A | 2/2016 |
| EP | 1433645 A2 | 6/2004 |
| SU | 1411162 A1 | 7/1988 |

OTHER PUBLICATIONS

English translation of CN1982109A retrieved from https://patents.google.com/patent/CN1982109A/en?oq=cn1982109A on Jul. 28, 2021.

English translation of CN104343944A retrieved from https://patents.google.com/patent/CN104343944A/en?oq=CN104343944A on Jul. 28, 2021.

English translation of CN102733929A retrieved from https://patents.google.com/patent/CN102733929A/en?oq=CN102733929 on Jul. 28, 2021.

English translation of CN1907797A retrieved from https://patents.google.com/patent/CN1907797A/en?oq=CN1907797 on Jul. 28, 2021.

English translation of CN101318458A retrieved from https://patents.google.com/patent/CN101318458A/en?oq=CN101318458A on Jul. 28, 2021.

English translation of CN105298613A retrieved from https://patents.google.com/patent/CN105298613A/en?oq=CN105298613A on Jul. 28, 2021.

English translation of CN105082985A retrieved from https://patents.google.com/patent/CN105082985A/en?oq=CN105082985A on Jul. 28, 2021.

English translation of CN1896490A retrieved from https://patents.google.com/patent/CN1896490A/en?oq=CN1896490A on Jul. 28, 2021.

Office Action issued from the Chinese Patent Office in connection with the Application No. 201780025976.6 on Jun. 3, 2021.

Office Action issued from the Chinese Patent Office in connection with the Application No. 201780026497.6 on Jun. 3, 2021.

Office Action issued by the USPTO on Jun. 25, 2021 in connection with the U.S. Appl. No. 16/188,790 and including a PTO-892 Form.

English translation of SU1411162A1 retrieved from https://patents.google.com/patent/SU1411162A1/en?oq=su1411162 on Aug. 27, 2020.

International Search Report of PCT/IB2017/052485, Lee W. Young, Sep. 29, 2017.

* cited by examiner

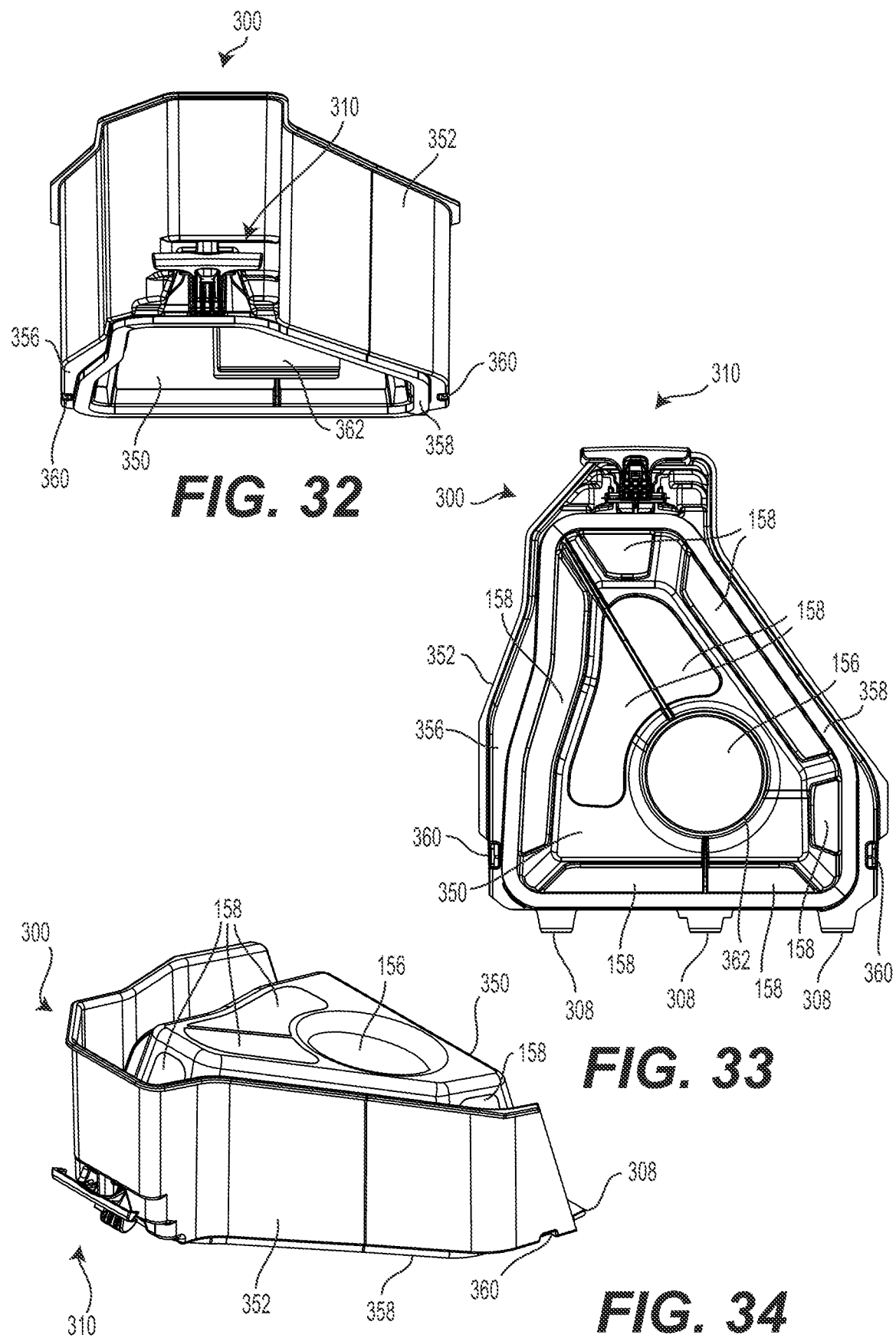

AIR INTAKE SYSTEM FOR AN OFF-ROAD VEHICLE

CROSS-REFERENCE

The present application is a divisional of U.S. patent application Ser. No. 16/096,926, filed on Oct. 26, 2018, which is a National Phase Entry of International Patent Application No. PCT/IB2017/052485, filed Apr. 28, 2017, which claims priority to U.S. Provisional Patent Application No. 62/328,893, filed Apr. 28, 2016, the entirety of all of which is incorporated herein by reference.

FIELD OF TECHNOLOGY

The present technology relates to an air intake system for off-road vehicles and an off-road vehicle having such an air intake system.

BACKGROUND

There exist various types of vehicles used mainly in off-road conditions. One such type is the side-by-side off-road vehicle (SSV). The name "side-by-side" refers to the seating arrangement of the vehicle in which the driver and a passenger are seated side-by-side. Some side-by-side off-road vehicles also have a second row of seats to accommodate one or more additional passengers. These vehicles typically have an open cockpit, a roll cage and a steering wheel.

As would be understood, in order to operate, the internal combustion engine of a SSV needs to be supplied with air. This air needs to be as free as possible of dust, debris and water, otherwise the engine will not operate as efficiently as it could and there is also a risk of damaging the engine. Since SSVs operate in off-road conditions, the environment in which they operate tends to be dustier, to have more debris and to be wetter than the environment in which on-road vehicles typically operate. The off-road environment therefore makes the desired supply of fresh air to the engine difficult.

Also, many SSVs use a continuously variable transmission (CVT) to transfer torque from the engine to the wheels. The components of the CVT can get hot during operation. As such, it is desirable to cool these components. One way of cooling these components is to supply air to the CVT so as to air-cool its components. However, this air should also be as free as possible of dust, debris and water. As discussed above, the off-road environment in which SSVs operate make this difficult.

Furthermore, side-by-side off-road vehicles are generally narrower and shorter than on-road vehicles such as cars. As such, there is less space available to dispose the various components that would be needed to supply clean air to the engine and the components that would be needed to supply clean air to the CVT.

Thus there is a desire for an arrangement of components for supplying air to the engine and to the CVT that is suitable for the operating conditions and limited overall dimensions of side-by-side off-road vehicles.

SUMMARY

It is an object of the present technology to ameliorate at least some of the inconveniences present in the prior art.

According to one aspect of the present technology, there is provided a vehicle having a frame, at least one ground engaging member operatively connected to the frame, an internal combustion engine connected to the frame, a continuously variable transmission (CVT) and an air intake assembly. The CVT has a CVT housing, a primary pulley housed in the CVT housing and operatively connected to the engine, a secondary pulley housed in the CVT housing and operatively connected to at least one of the at least one ground engaging member, and a belt housed in the CVT housing and looped around the primary and secondary pulleys to transfer torque between the primary and secondary pulleys. The air intake assembly has at least one air intake assembly inlet, at least one first air intake assembly aperture and at least one second air intake assembly aperture. The at least one first air intake assembly aperture fluidly communicates with at least one air intake port of the engine. The at least one second air intake assembly aperture fluidly communicates with an interior of the CVT housing. A portion of air entering the air intake assembly via the at least one air intake assembly inlet flows out of the air intake assembly via the at least one first air intake assembly aperture and then flows to the at least one air intake port of the engine. Another portion of air entering the air intake assembly via the at least one air intake assembly inlet flows out of the air intake assembly via the at least one second air intake assembly aperture and then flows to the interior of the CVT housing.

According to some implementations of the present technology, at least one CVT inlet conduit fluidly communicates the at least one second air intake assembly aperture with the interior of the CVT housing.

According to some implementations of the present technology, the at least one CVT inlet conduit is two CVT inlet conduits. An outlet of one of the two CVT inlet conduits is disposed closer to the primary pulley than to the secondary pulley. An outlet of another one of the two CVT inlet conduits is disposed closer to the secondary pulley than to the primary pulley.

According to some implementations of the present technology, the CVT housing includes a first portion and a second portion. The first portion is separable from the second portion. The outlet of the one of the two CVT inlet conduits is disposed in the first portion. The outlet of the other one of the two CVT inlet conduits is disposed in the second portion.

According to some implementations of the present technology, at least one CVT outlet conduit fluidly communicates the interior of the CVT housing with the atmosphere.

According to some implementations of the present technology, the at least one CVT outlet conduit is two CVT outlet conduits. An inlet of one of the two CVT outlet conduits is disposed closer to the primary pulley than to the secondary pulley. An inlet of another one of the two CVT outlet conduits is disposed closer to the secondary pulley than to the primary pulley.

According to some implementations of the present technology, an exhaust system is fluidly connected to an exhaust port of the engine. The at least one CVT outlet conduit is oriented to direct air flowing out of the CVT housing via the at least one CVT outlet conduit over a portion of the exhaust system.

According to some implementations of the present technology, a turbocharger is fluidly connected between the at least one first air intake assembly aperture and the at least one air intake port of the engine. The at least one CVT outlet conduit is oriented to direct air flowing out of the CVT housing via the at least one CVT outlet conduit over a portion of the turbocharger.

According to some implementations of the present technology, a turbocharger is fluidly connected between the at least one first air intake assembly aperture and the at least one air intake port of the engine.

According to some implementations of the present technology, an air filter fluidly connected between the at least one first air intake assembly aperture and the turbocharger.

According to some implementations of the present technology, a blow-by gas tube fluidly communicates the engine with a conduit fluidly communicating the air filter with the turbocharger.

According to some implementations of the present technology, an intercooler fluidly communicates with the turbocharger for receiving pressurized air from the turbocharger. The intercooler fluidly communicates with the engine for supplying air to the engine.

According to some implementations of the present technology, a base is disposed above the engine. The intercooler and the air intake assembly are mounted to the base.

According to some implementations of the present technology, a base is disposed above the engine. The air intake assembly is mounted to the base.

According to some implementations of the present technology, the air intake assembly is removable from the base. The air intake assembly defines a space and a third air intake assembly aperture below the base. A compressible bellows is disposed in the space and is connected between the at least one first air intake assembly aperture and the third air intake assembly aperture.

According to some implementations of the present technology, the air intake assembly includes a filter housing defining the at least one first air intake assembly aperture and the at least one second air intake assembly aperture, a cover disposed over and being at least partially spaced from a top of the filter housing, the cover extending down over at least one of a side of the filter housing, and the at least one air intake assembly inlet is defined at least in part between the filter housing and the cover.

According to some implementations of the present technology, at least one screen filter is disposed in the air intake assembly and connected to the at least one second air intake assembly aperture for filtering air entering the at least one second air intake assembly aperture.

According to some implementations of the present technology, a seat is connected to the frame. The seat has a seat bottom, a seat back and a headrest. The at least one air intake assembly inlet is disposed rearward of the headrest and is at least partially aligned laterally and vertically with the headrest.

According to another aspect of the present technology, there is provided vehicle having a frame, a seat connected to the frame, at least one ground engaging member operatively connected to the frame, an internal combustion engine connected to the frame, the internal combustion engine being operatively connected to at least one of the at least one ground engaging member, and an air intake assembly having at least one air intake assembly inlet and at least one air intake assembly aperture. The seat has a seat bottom, a seat back and a headrest. The at least one air intake assembly aperture fluidly communicates with at least one air intake port of the engine. The at least one air intake assembly inlet is disposed rearward of the headrest and is at least partially aligned laterally and vertically with the headrest.

According to some implementations of the present technology, the at least one air intake assembly inlet faces generally forward.

According to some implementations of the present technology, the seat is a driver seat. A passenger seat is connected to the frame. The passenger seat has a seat bottom, a seat back and a headrest. The driver and passenger seats are disposed laterally next to each other. The seat backs of the driver and passenger seats define a space therebetween. An intercooler fluidly communicates the at least one air intake assembly aperture with the engine. The intercooler is disposed rearward of the driver and passenger seats. The intercooler being at least partially aligned laterally with the space defined between the seat backs of the driver and passenger seats.

According to some implementations of the present technology, a base is disposed above the engine. The intercooler and the air intake assembly are mounted to the base.

According to another aspect of the present technology, there is provide a filter housing having a first aperture, a tube connected to and extending from the first aperture, at least one second aperture, and at least one filter connected to the at least one second aperture for filtering air entering the at least one second aperture. A portion of air entering the filter housing flows out of the filter housing via the first aperture and through the tube. Another portion of air entering the filter housing flows out of the filter housing via the at least one second aperture around the tube separately from the portion of air flowing out of the filter housing via the first aperture.

According to some implementations of the present technology, the filter housing has a central raised portion. The first aperture and the at least one second aperture are defined in the raised portion. The tube extends inside the raised portion.

According to some implementations of the present technology, a floor extends from a bottom of the central raised portion. A vertical wall extends from the floor along three sides of the central raised portion. The floor is disposed between the central raised portion and the vertical wall.

According to some implementations of the present technology, a seal is connected to a bottom of the floor.

According to some implementations of the present technology, drain apertures are defined in a bottom of the vertical wall.

According to some implementations of the present technology, the filter housing has a latch.

According to some implementations of the present technology, a grating is provided over the first aperture.

According to some implementations of the present technology, the at least one second aperture includes: two second apertures defined in a top of the central raised portion, and six air intake assembly apertures defined in sides, front and back of the central raised portion.

According to some implementations of the present technology, the at least one filter is a screen filter.

For purposes of this application, terms related to spatial orientation such as forwardly, rearward, upwardly, downwardly, left, and right, are as they would normally be understood by a driver of the vehicle sitting thereon in a normal riding position. Terms related to spatial orientation when describing or referring to components or sub-assemblies of the vehicle, separately from the vehicle should be understood as they would be understood when these components or sub-assemblies are mounted to the vehicle, unless specified otherwise in this application. In the event of a discrepancy between an explanation in the present application and an explanation in a document incorporated herein by reference, the explanation in the present application takes precedence.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 32 is a rear elevation view of the filter housing of FIG. 28;

FIG. 33 is a bottom plan view of the filter housing of FIG. 28;

FIG. 34 is a perspective view taken from a rear, right side of the filter housing of FIG. 28;

DETAILED DESCRIPTION

Figure 1:
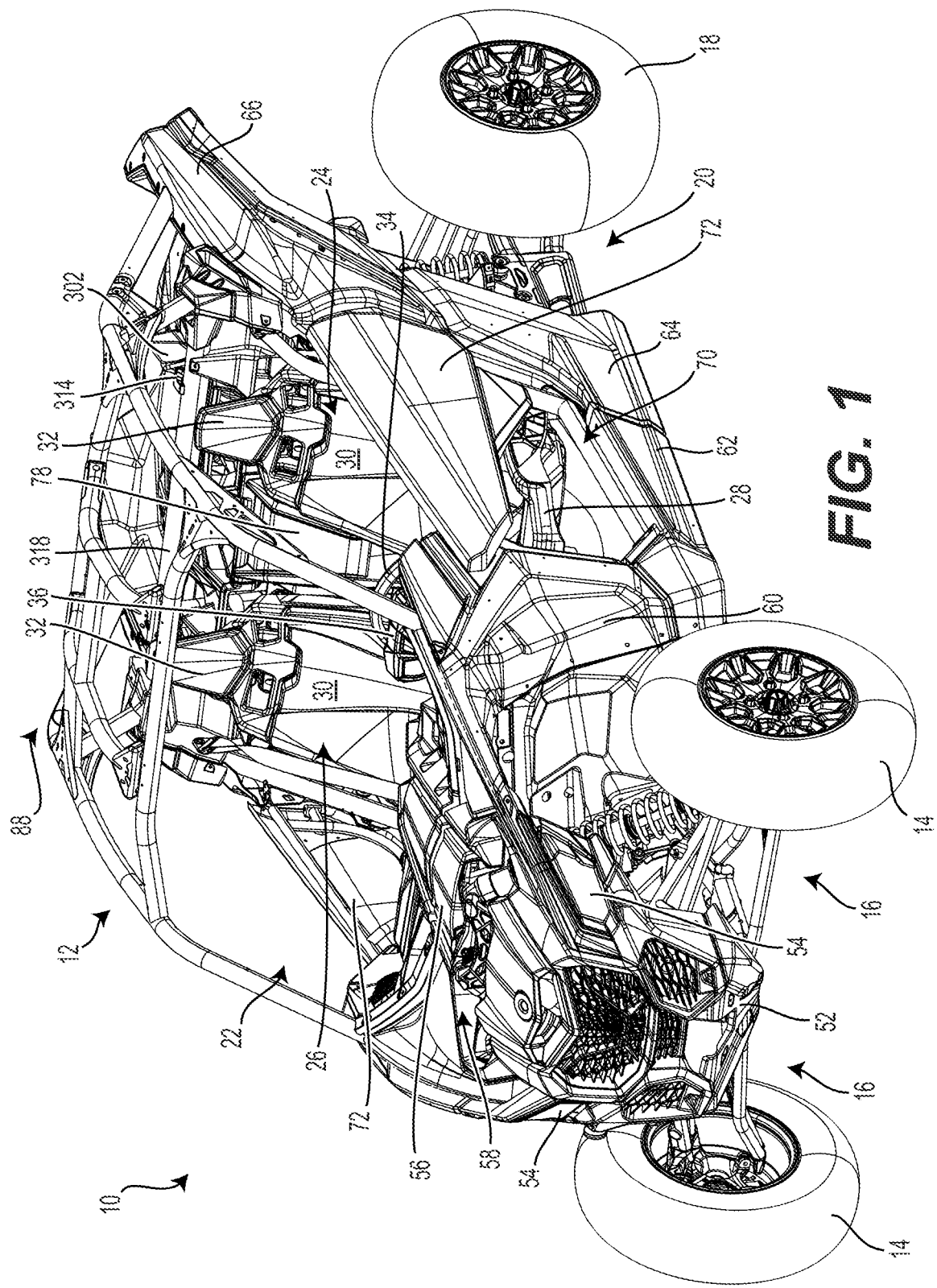
FIG. 1 is a perspective view of an off-road vehicle taken from a front, left side.

The present technology will be described with respect to a four-wheel off-road vehicle 10 having two side-by-side seats 24, 26 and a steering wheel 34. However, it is contemplated that some aspects of the present technology may apply to other types of vehicles such as, but not limited to, off-road vehicles having more or less than four wheels.

The general features of the off-road vehicle 10 will be described with respect to FIGS. 1 to 5. The vehicle 10 has a frame 12, two front wheels 14 connected to a front of the frame 12 by front suspension assemblies 16 and two rear wheels 18 connected to the frame 12 by rear suspension assemblies 20.

The frame 12 defines a central cockpit area 22 inside which are disposed a driver seat 24 and a passenger seat 26. In the present implementation, the driver seat 24 is disposed on the left side of the vehicle 10 and the passenger seat 26 is disposed on the right side of the vehicle 10. However, it is contemplated that the driver seat 24 could be disposed on the right side of the vehicle 10 and that the passenger seat 26 could be disposed on the left side of the vehicle 10. Each seat 24, 26 has a seat bottom 28, a seat back 30 and a headrest 32.

A steering wheel 34 is disposed in front of the driver seat 24. The steering wheel 34 is used to turn the front wheels 14 to steer the vehicle 10. Various displays and gauges 36 are disposed above the steering wheel 34 to provide information to the driver regarding the operating conditions of the vehicle 10. Examples of displays and gauges 36 include, but are not limited to, a speedometer, a tachometer, a fuel gauge, a transmission position display, and an oil temperature gauge.

Figure 2:
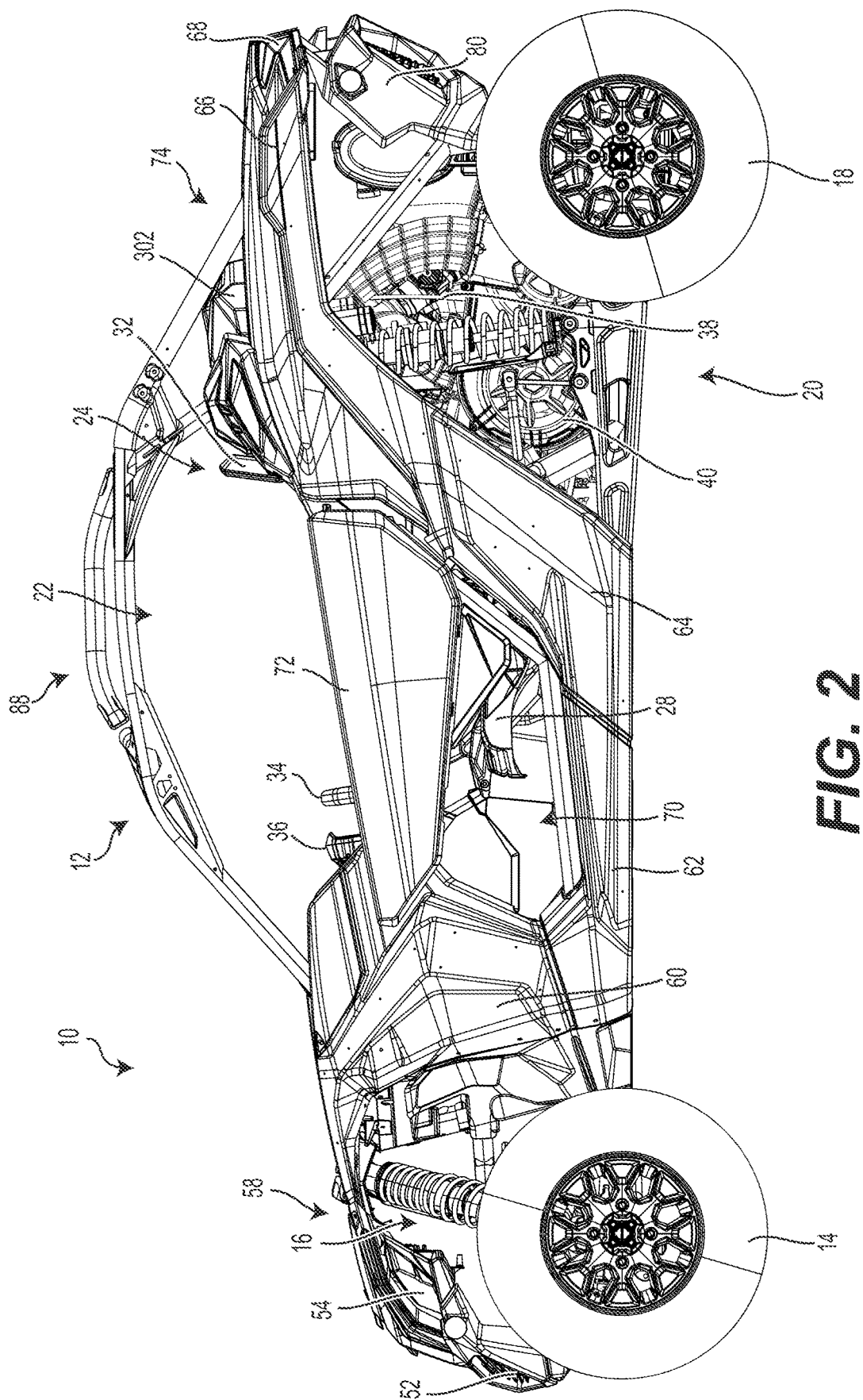
FIG. 2 is a left side elevation view thereof.
Figure 3:
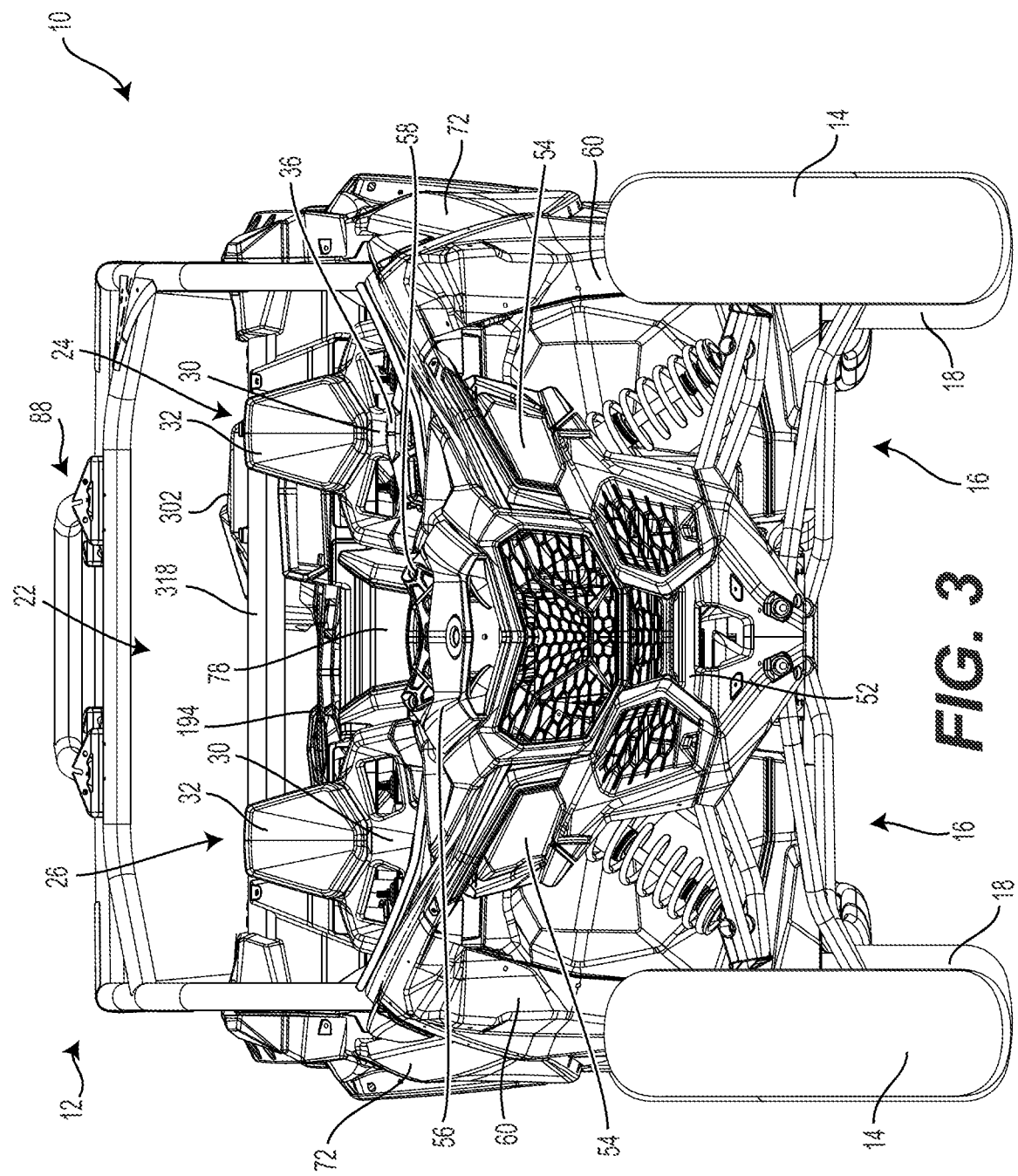
FIG. 3 is a front elevation view thereof.

As can be seen in FIG. 2, an engine 38 is connected to the frame 12 in a rear portion of the vehicle 10. The engine 38 is connected to a continuously variable transmission (CVT) 40 disposed on a left side of the engine 38. The CVT 40 includes a CVT housing 42 inside which a primary pulley 44, a secondary pulley 46 and a belt 48 (shown in dotted lines in FIG. 12) of the CVT 40 are housed. The CVT 40 is operatively connected to a transaxle 50 (FIG. 12) to transmit torque from the engine 38 to the transaxle 50. The transaxle 50 is disposed behind the engine 38. The primary pulley 44 is mounted to an output shaft 45 (FIG. 13) of the engine 38. The secondary pulley 46 is mounted to an input shaft 47 (FIG. 13) of the transaxle 50. The belt 48 is looped around the primary and secondary pulleys 44, 46 to transmit torque between the primary and secondary pulleys 44, 46. The transaxle 50 is operatively connected to the front and rear wheels 14, 18 to propel the vehicle 10. A fuel tank (not shown) is suspended from the frame 12 in front of the passenger seat 26 and stores the fuel to be used by the engine 38.

Turning back to FIGS. 1 to 5, body panels of the vehicle 10 will be described. The body panels are connected to the frame 12. The panels help protect the internal components of the vehicle 10 and provide some of the aesthetic features of the vehicle 10. Front panels 52 are connected to a front of the frame 12. The front panels 52 are disposed forward of the front suspension assemblies 16 and laterally between the front wheels 14. The front panels 52 define two apertures inside which the headlights 54 of the vehicle 10 are disposed. A cover 56 extends generally horizontally reward from a top of the front panels 52. The cover 56 defines an aperture 58 through which tops of the front suspension assemblies 16 protrude. Front fenders 60 are disposed rearward of the front panels 52 on each side of the vehicle 10. Each front fender 60 is disposed in part above and in part behind of its corresponding front wheel 14. Lower panels 62 extend along the bottom of the frame 12 between the front and rear wheels 14, 18. As can be seen in FIG. 2 for the left lower panel 62, each lower panel 62 has a front end disposed under the bottom portion of its corresponding front fender 60 and extends rearward therefrom. A generally L-shaped panel 64 is disposed behind the rear end of each lower panel 62. Generally L-shaped rear fenders 66 extend upward and then rearward from the rear, upper ends of the L-shaped panels 64. Each rear fender 66 is disposed in part above and in part forward of its corresponding rear wheel 18. The rear fenders 66 define apertures at the rear thereof to receive the brake lights 68 of the vehicle 10. It is contemplated that the brake lights 68 could be replaced with reflectors or that reflectors could be provided in addition to the brake lights 68.

On each side of the vehicle 10, the front fender 60, the lower panel 62, the L-shaped panel 64 and the rear fender 66 define a passage 70 through which a driver (or passenger depending on the side of the vehicle 10) can enter or exit the vehicle 10. Each side of the vehicle 10 is provided with a door 72 that selectively closes an upper portion of the corresponding passage 70. Each door 72 is hinged at a rear thereof to its corresponding rear fender 66 and its associated portion of the frame 12. Each door 72 is also selectively connected at a front thereof to the frame 12 via a releasable latch (not shown). It is contemplated that each door 72 could be hinged at a front thereof and latched at a rear thereof. As best seen in FIG. 2 for the left side of the vehicle 10, when the doors 72 are closed the lower portions of the passages 70 are still opened. It is contemplated that nets could extend in the lower portions of the passages 70 when the doors 72 are closed or that the doors 72 could be larger so as to close the lower portions of the passages 70.

Figure 4:
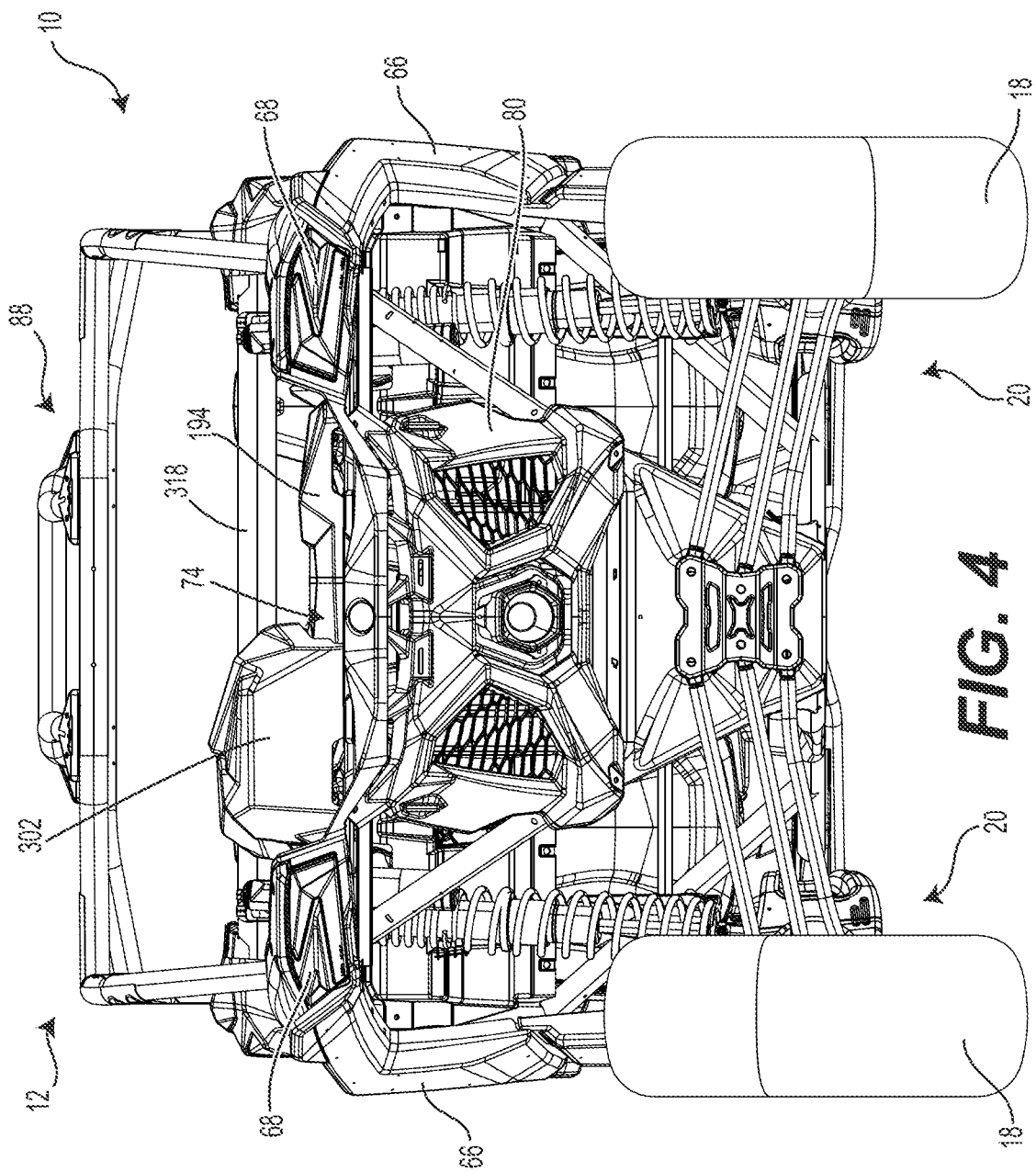
FIG. 4 is a rear elevation view thereof.
Figure 5:
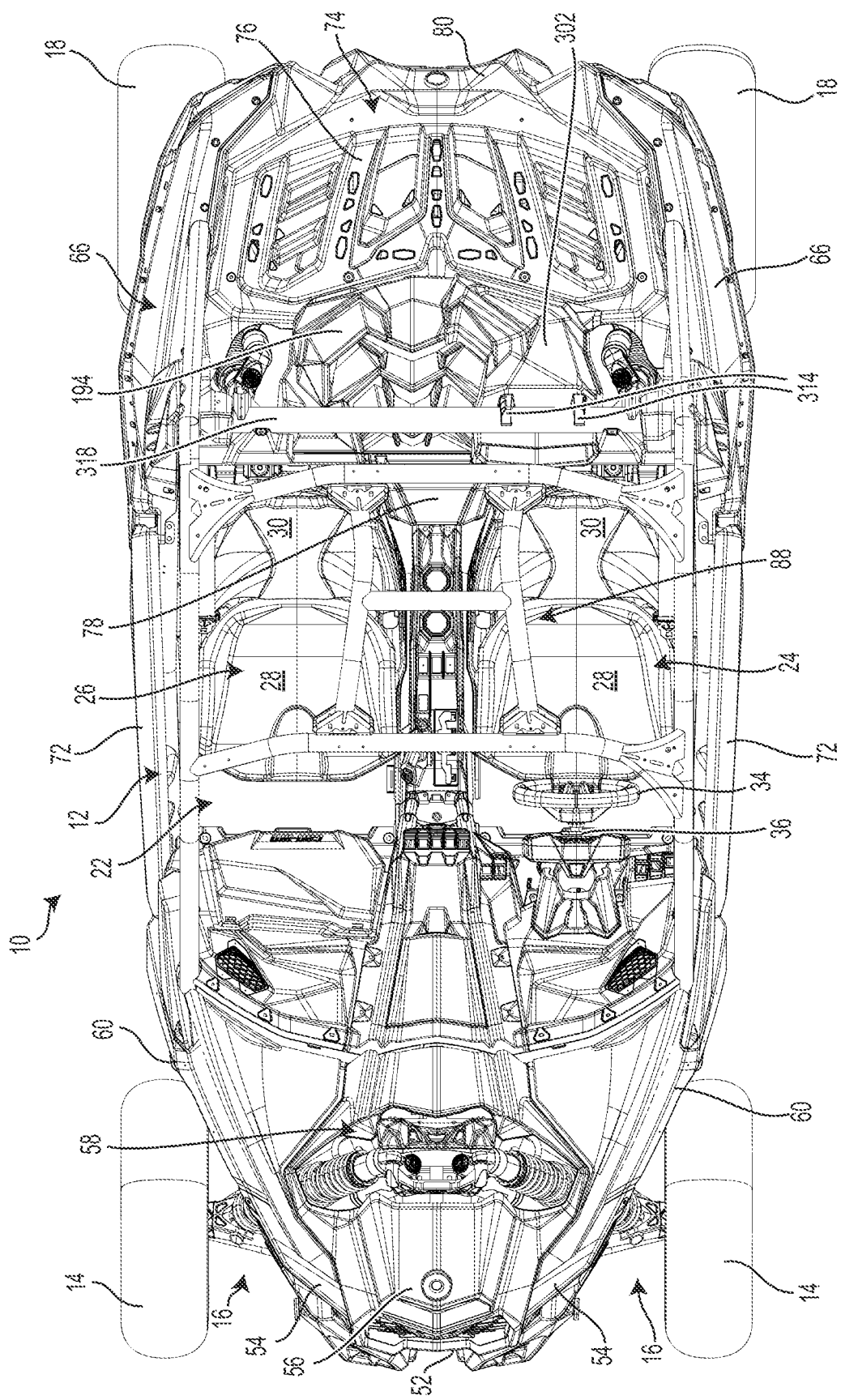
FIG. 5 is a top plan view thereof.
Figure 6:
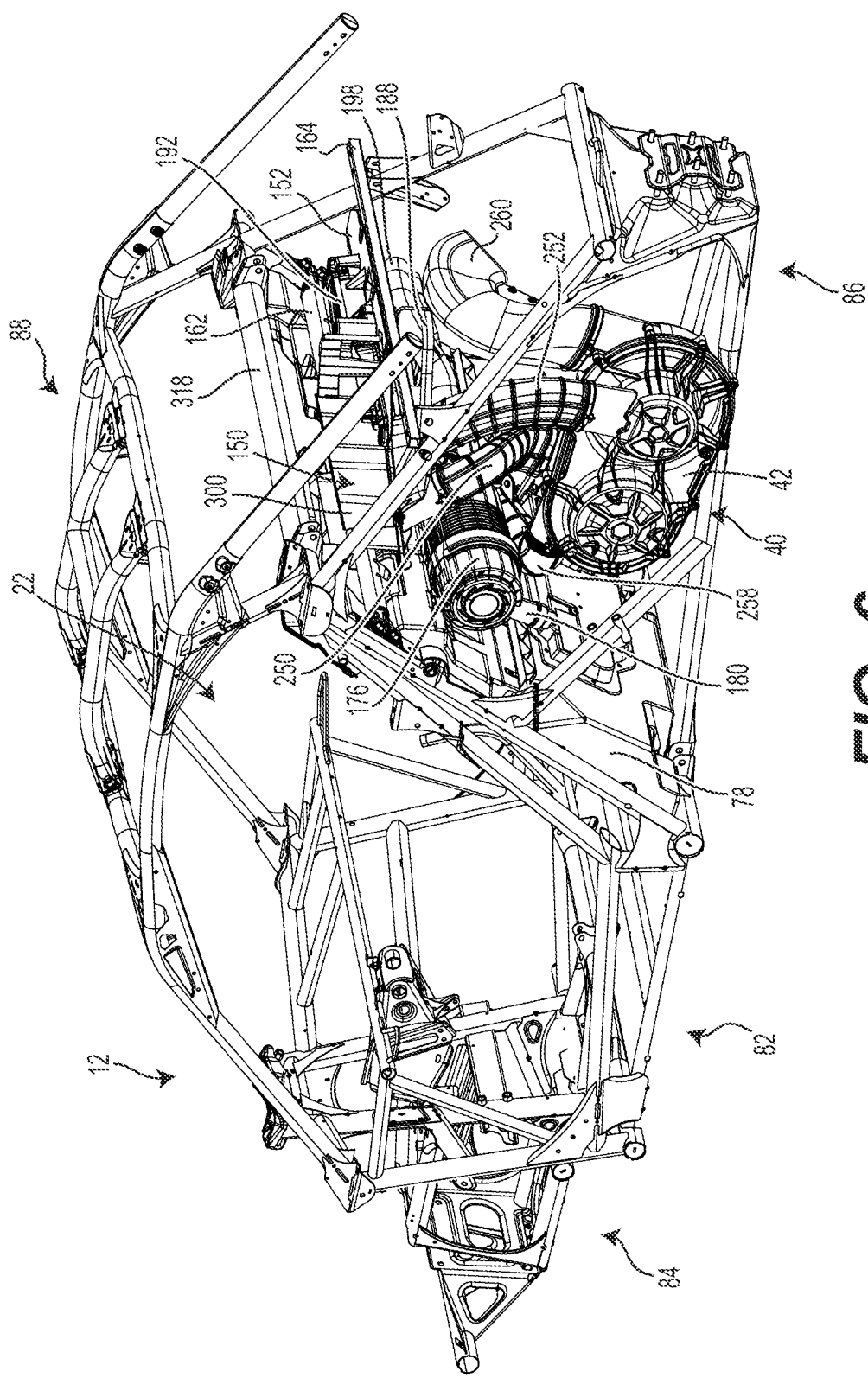
FIG. 6 is a perspective view taken from a rear, left side of a frame, a CVT and a portion of an air intake system of the vehicle of FIG. 1.

As best seen in FIG. 5, the rear fenders 66 define a cargo space 74 therebetween behind the seats 24, 26. The cargo space 74 has a floor 76 extending horizontally between the rear fenders 66. The floor 76 has a plurality of apertures such that the floor 76 can act as an attachments base to receive anchors such as those described in U.S. Pat. No. 8,875,830, issued Nov. 4, 2014, the entirety of which is incorporated herein by reference, in order to secure various items in the cargo space 74. It is contemplated that hooks or loops could be provided instead of or in addition to the apertures in the floor 76. It is also contemplated that the floor 76 could not be provided with any attachment features. It is contemplated that the floor 76 could be replaced by a cargo box that can be tilted in order to dump its content. A separation wall 78 (best seen in FIG. 6) is connected to the frame 12, extends laterally and is disposed longitudinally between the seats 24, 26 and the floor 76. As a result, the separation wall 78 separates the cockpit area 22 from the cargo space 74. As best seen in FIGS. 4 and 5, rear panels 80 are disposed laterally between the rear wheels 18 behind the floor 76.

Turning now to FIGS. 6 to 10, the frame 12 of the vehicle 10 will be described in more detail. The frame 12 has a central portion 82, a front portion 84 and a rear portion 86. As their names suggest, the front portion 84 is disposed in front of the central portion 82 and the rear portion 86 is disposed behind the central portion 82. The central portion 82 defines the cockpit area 22 in which the seats 24, 26 are disposed. The central portion 82 also defines a roll cage 88. The front suspension assemblies 16, which are double A-arms suspensions, are connected to the central and front portions 82, 84 of the frame 12. The engine 38, the CVT 40 and the transaxle 50 are supported by the rear portion 86 of the frame 12. The rear suspension assemblies 20, which are trailing arm suspensions, are connected to the central and rear portions 82, 86 of the frame 12. The frame 12 is made from a plurality of hollow cylindrical steel members and steel brackets that are welded to each other. It is contemplated that at least some of the hollow cylindrical members could be replaced by other types of members such as solid cylindrical members, hollow tubes having a cross-section other than circular, and beams, for example. It is also contemplated that the members and brackets could be made of another type of metal, such as aluminum for example. It is also contemplated that at least some of the members and brackets could be made of a non-metallic material, such as composite materials or plastics for example. It is also contemplated that at least some of the members and brackets could be joined to each other by means other than welding, such as by fastening and bonding for example. It is also contemplated that two or more of the members and brackets described below could be cast or otherwise formed as a single component. It is also contemplated that the frame 12 could have more or less members and brackets than described below depending on the type of materials used, the required strength and rigidity of the frame 12 and the weight of the components attached to the frame 12 for example.

Turning now to FIGS. 11 to 16, the powertrain of the vehicle 10 will be described. The engine 38 is connected to the frame 12 at a position behind the rearmost points of the seat bottoms 28. More specifically, the engine 38 has two engine mounts 100, 102 on a lower portion thereof that are connected to brackets 104, 106 respectively (FIG. 10) of the rear portion 86 of the frame 12. The engine 38 is an in-line, three-cylinder, four-stroke internal combustion engine. It is contemplated that other types of internal combustion engines could be use, such as a V-twin or a two-stroke internal combustion engine for example. It is also contemplated that in some implementations, the engine 38 could be replaced by another type of motor such as a diesel engine or an electric motor for example.

As previously mentioned, the CVT 50 is mounted on the left side of the engine 38 and of the transaxle 50. It is contemplated that the CVT 40 could be mounted on the right side of the engine 38 and of the transaxle 50. The engine 38 drives the CVT 32 which drives the transaxle 50.

Figure 35:
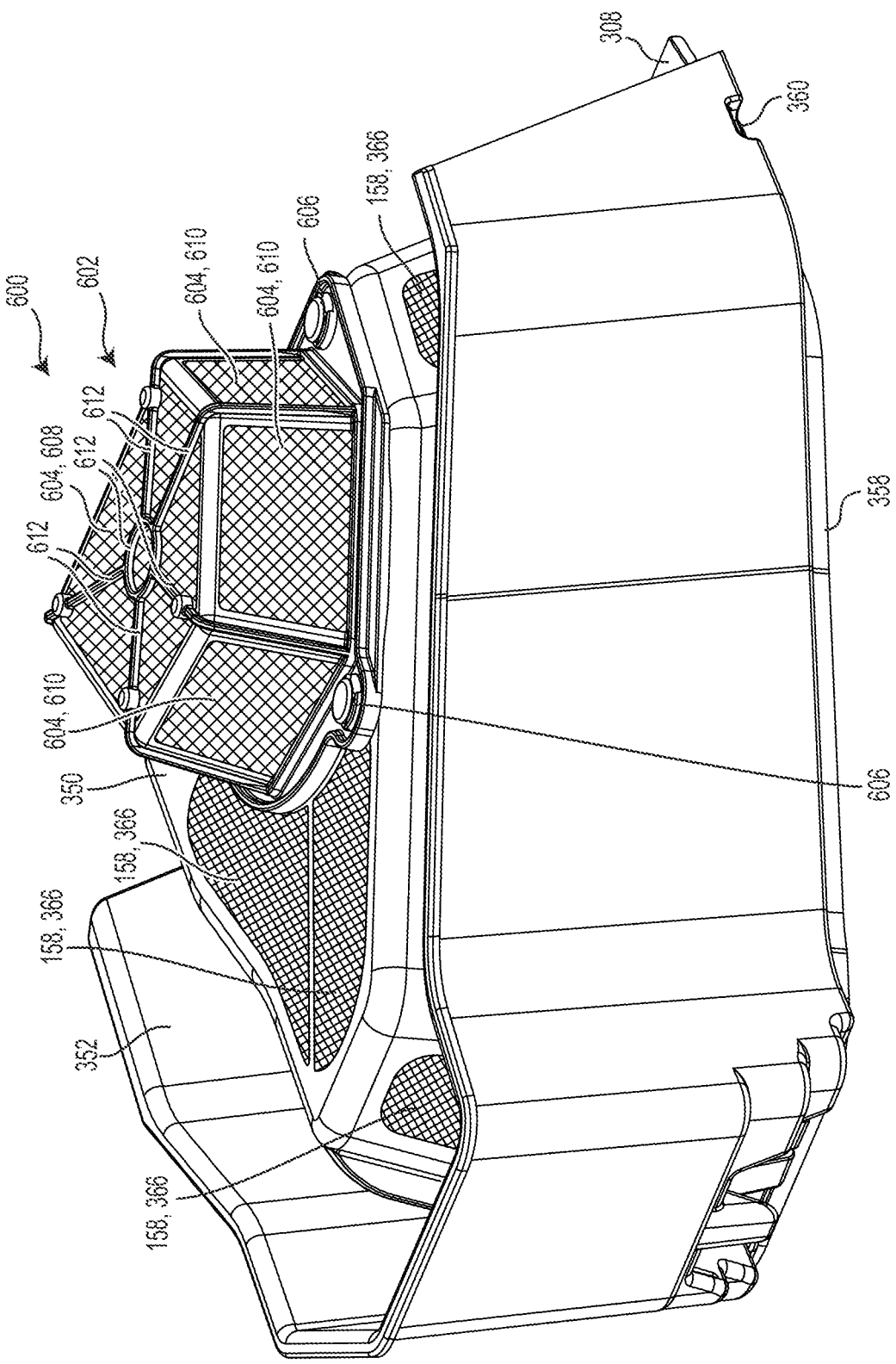
FIG. 35 is a perspective view taken from a rear, right side of alternative implementation of the filter housing of the air intake assembly.
Figure 36:
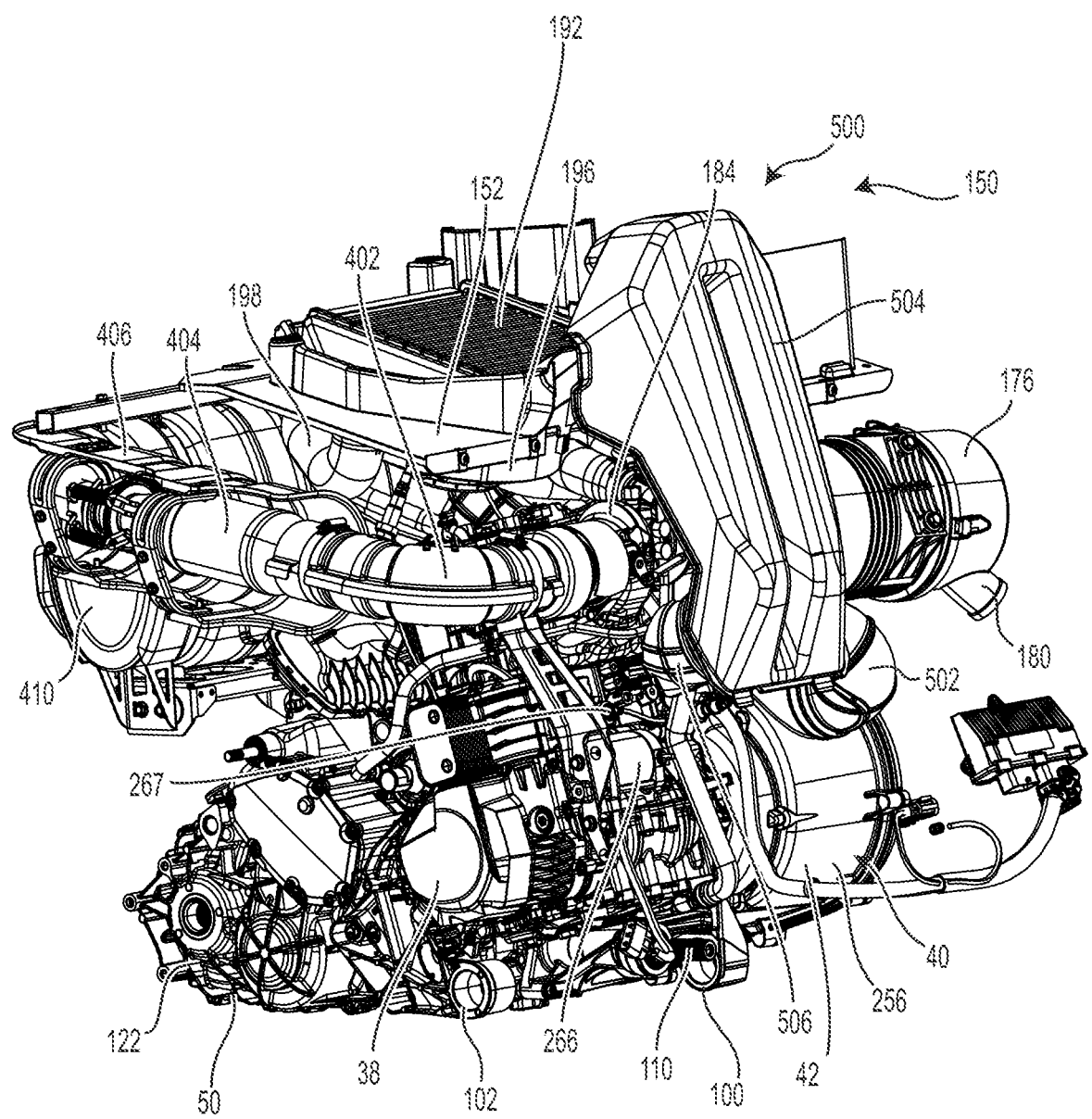
FIG. 36 is a perspective view taken from a front, right side of the engine, air intake system and exhaust system of the vehicle of FIG. 1, with an alternative implementation of a CVT outlet conduit, with some components removed for clarity.
Figure 37:
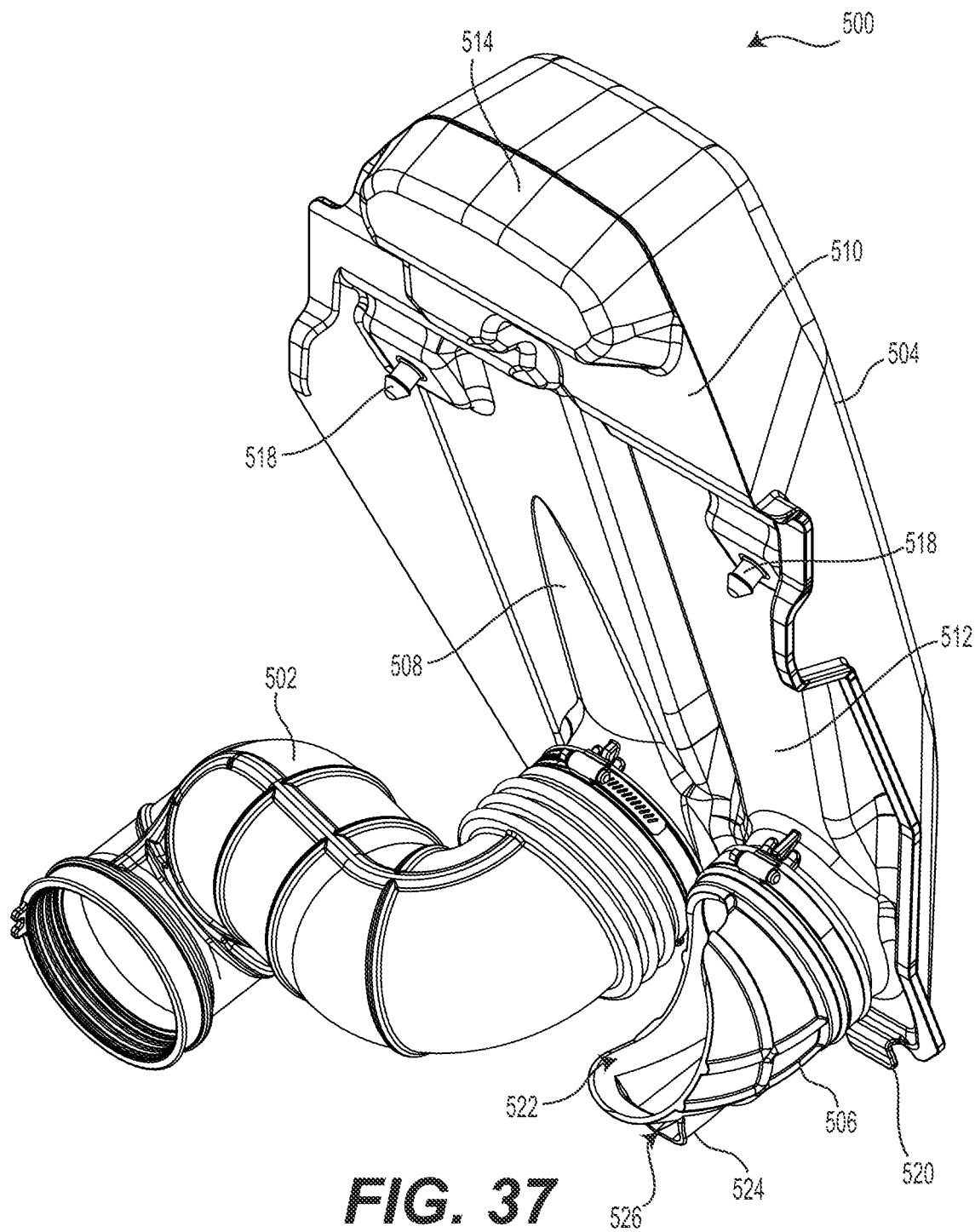
FIG. 37 is a perspective view taken from a rear, right side of the alternative implementation of the CVT outlet conduit of FIG. 36.
Figure 38:
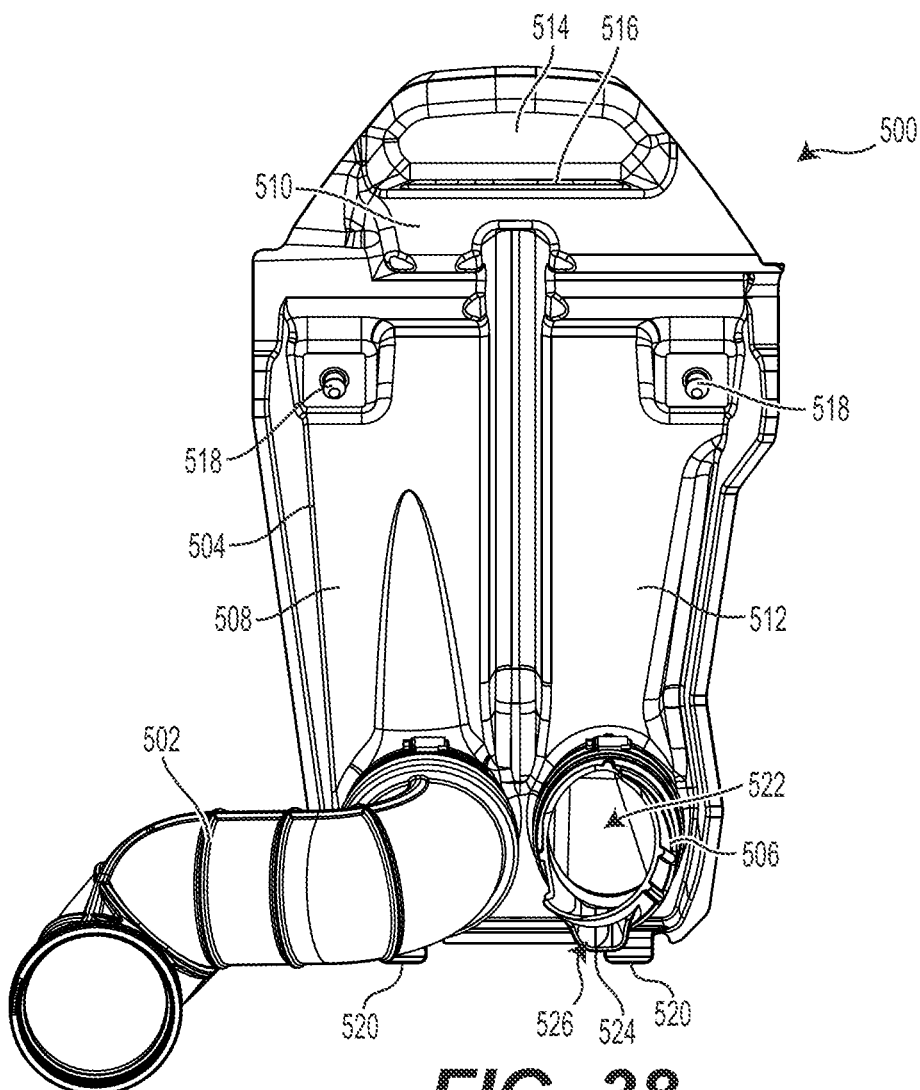
FIG. 38 is a rear view of the CVT outlet conduit of FIG. 37.

The transaxle 50 is mounted to the back of the engine 38. The transaxle 50 is mechanically connected to a shifter 108 (FIG. 35). The shifter 108 is disposed laterally between the two seats 24, 26. The shifter 108 allows the driver to select from a plurality of combinations of engagement of gears of the transaxle 50, commonly referred to as gears. In the present implementation, the shifter 108 allows the driver to select a reverse gear, two forward gears (high and low) and a neutral position in which the transaxle 50 does not transmit torque to the wheels 14, 18. It is contemplated that other types of connections between the shifter 108 and the transaxle 50 could be used. It is also contemplated that the transaxle 50 could select between transferring torque to only two of the wheels 14 or 18 and all four wheels 14, 18, in which case a two-wheel drive, four-wheel drive selector would be provided in the vicinity of the driver.

Figure 13:
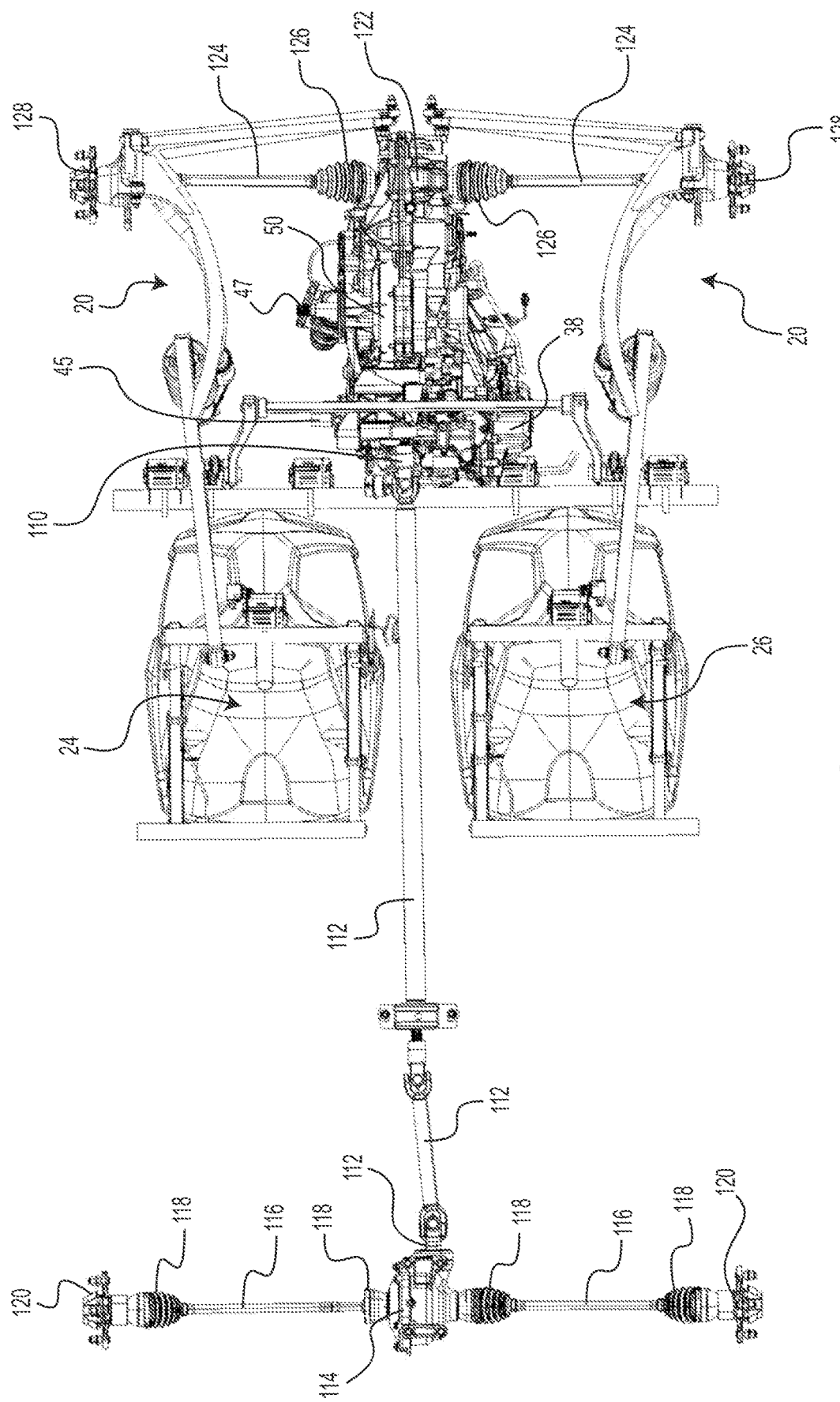
FIG. 13 is a bottom plan view of the seats, powertrain, and rear suspension assemblies of the vehicle of FIG. 1.

The transaxle 50 has a plurality of gear trains connected to and driving a front output shaft 110. As can be seen in FIG. 13, the front output shaft 110 is operatively connected to and drives three driveshaft 112 connected in series. The front driveshaft 112 drives a front differential 114. Driven output gears of the front differential 114 are operatively connected to and drive the left and right front wheels 14 via assemblies of half-shafts 116, constant velocity (CV) joints (not shown, but located inside flexible boots 118 in FIG. 13), front wheel axles (not shown), and front wheel hubs 120. The transaxle 50 incorporates a rear differential 122 that is driven by the plurality of gear trains. Driven output gears of the rear differential 122 are operatively connected to and drive the left and right rear wheels 18 via assemblies of half-shafts 124, constant velocity (CV) joints (not shown, but located inside flexible boots 126 in FIG. 13), rear wheel axles (not shown), and rear wheel hubs 128.

Turning now to FIGS. 14 to 27, the air intake system of the vehicle 10 will be described. The air intake system has an air intake assembly 150 mounted to a base 152 disposed above the engine 38. The air intake assembly 150 is disposed above a front, left portion of the engine 38. The air intake assembly 150 defines an air intake assembly inlet 154 (best seen in FIG. 20) through which air enters the air intake system. The air intake assembly 150 defines one air intake assembly aperture 156 and eight air intake assembly apertures 158. It is contemplated that the air intake assembly 150 could have more than one air intake assembly aperture 156 and more or less than eight air intake assembly apertures 158. The air intake assembly 150 will be described in greater detail below. Air exiting the air intake assembly 150 via the air intake assembly aperture 156 is supplied to the air intake ports of the engine 38 and air exiting the air intake assembly 150 via the air intake assembly apertures 158 is supplied to the interior of the CVT housing 42 as will be described below.

Figure 7:
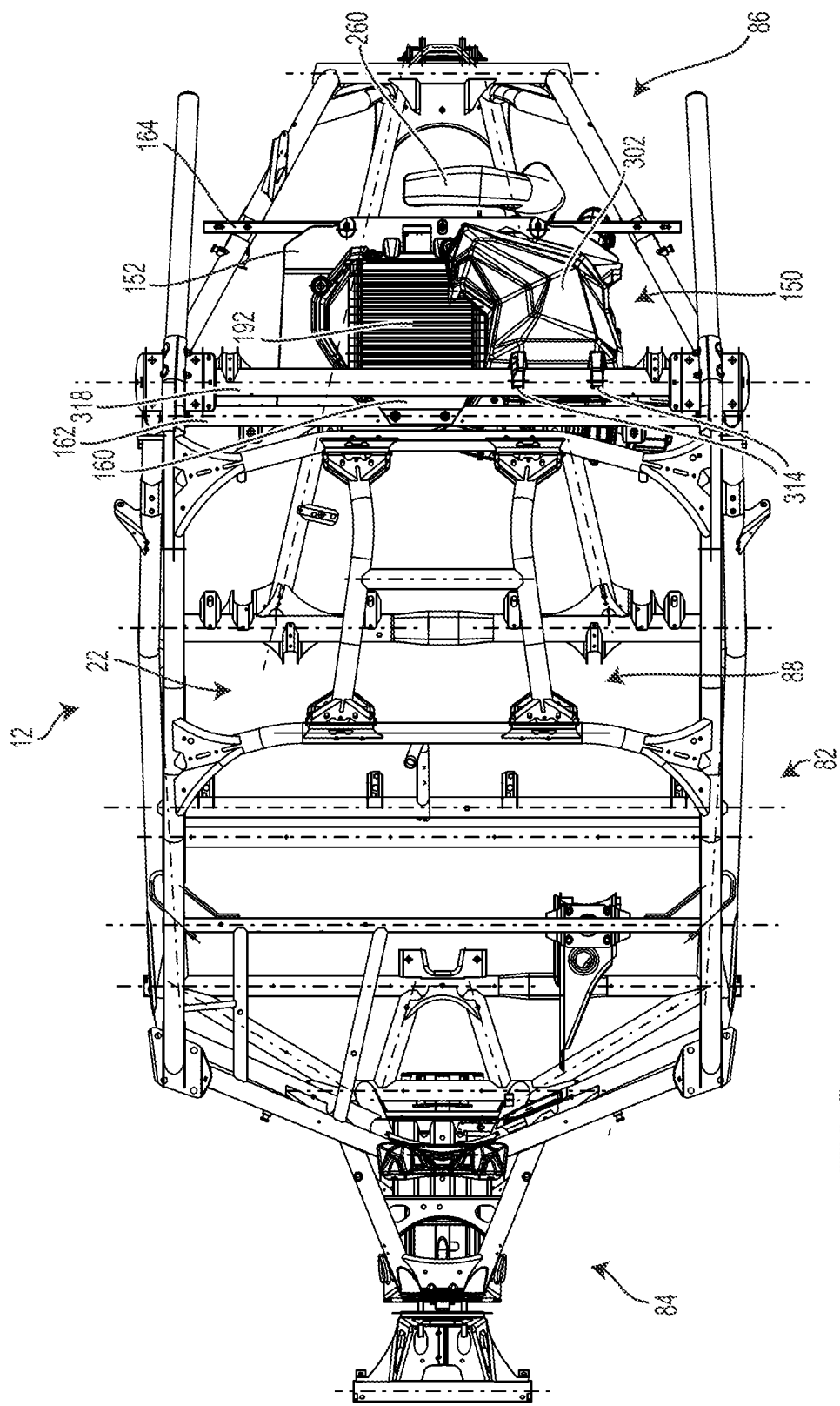
FIG. 7 is a top plan view of the frame and a portion of the air intake system of the vehicle of FIG. 1.
Figure 8:
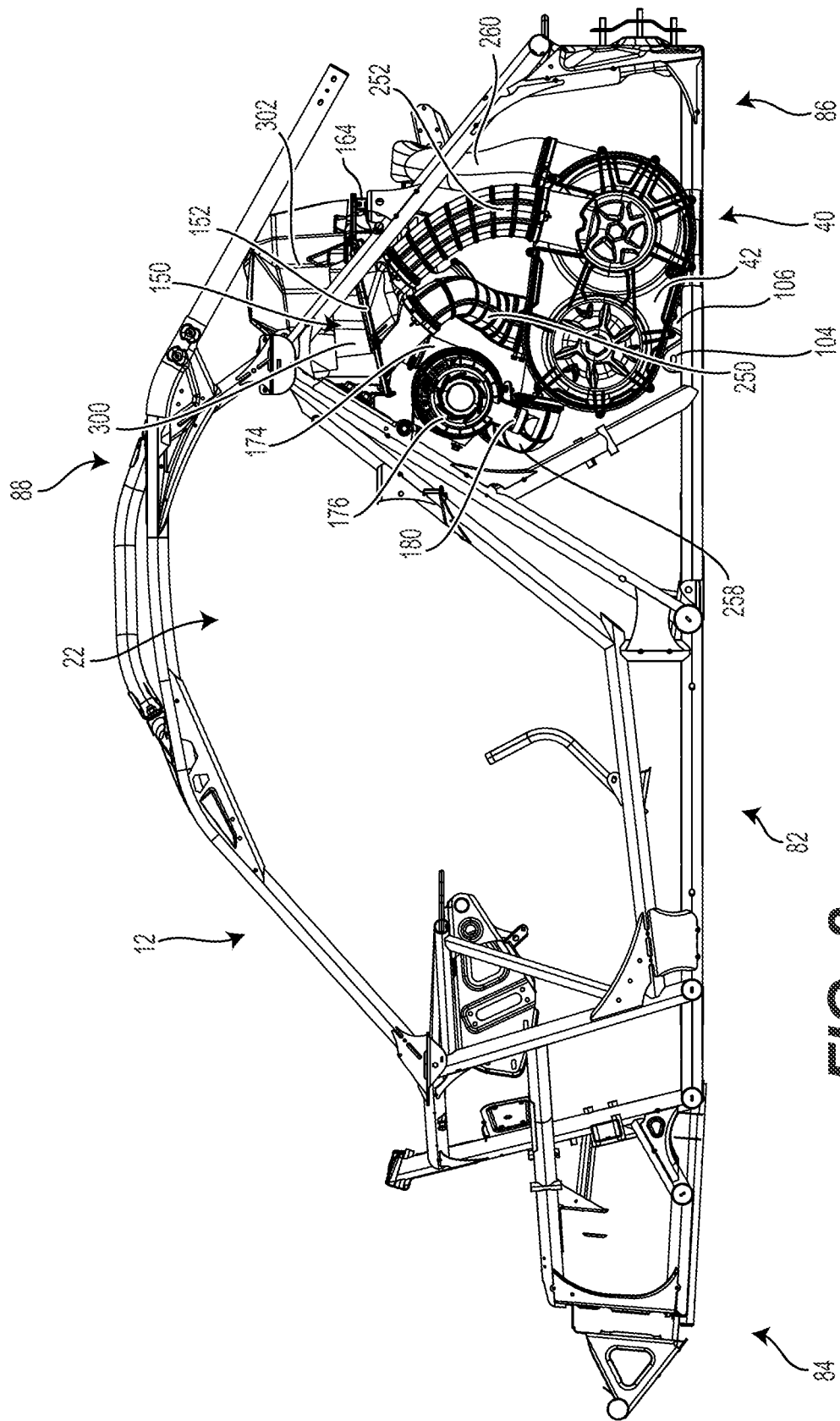
FIG. 8 is a left side elevation view of the frame, the CVT and a portion of the air intake system of the vehicle of FIG. 1.
Figure 9:
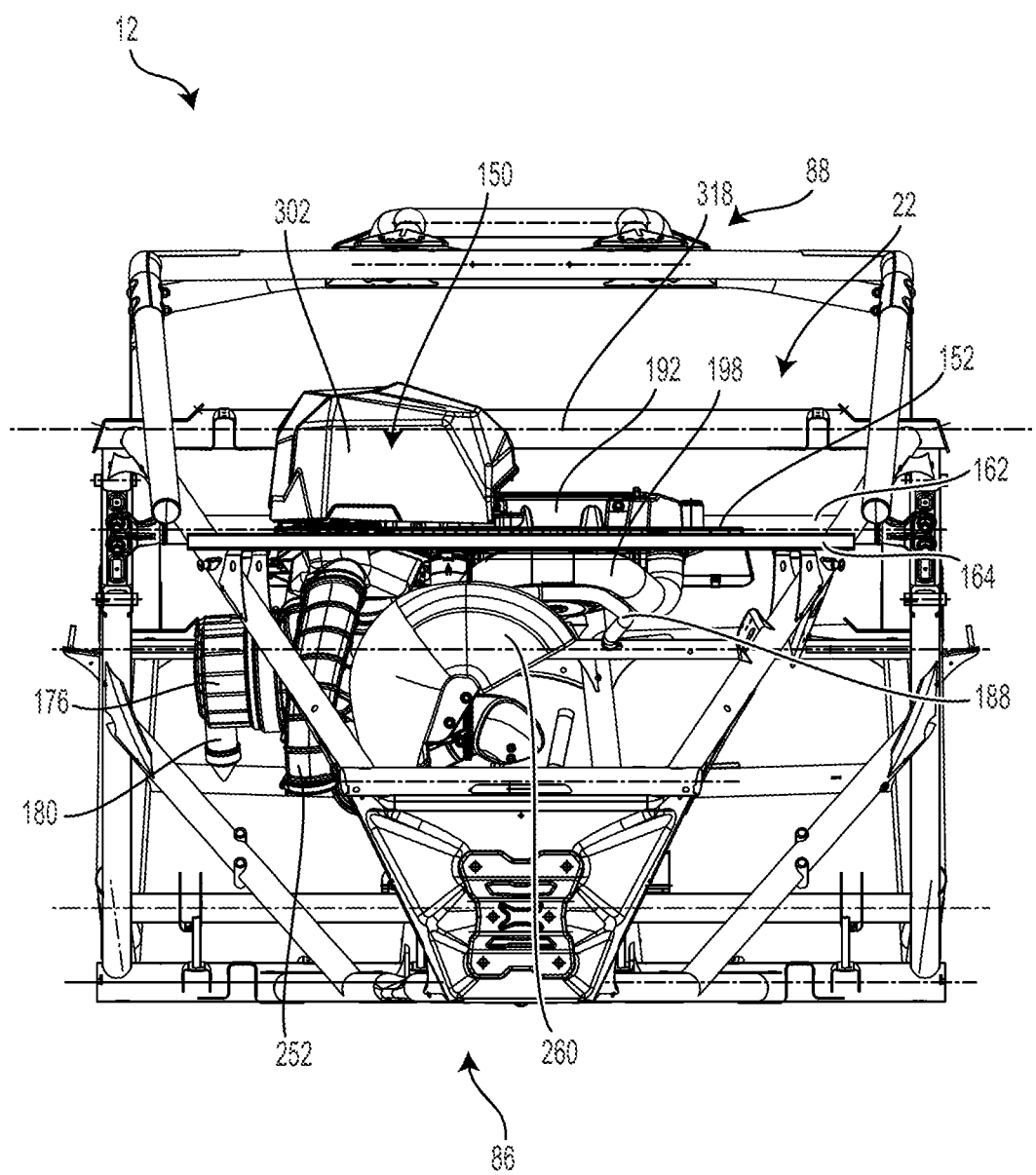
FIG. 9 is a rear elevation view of the frame and a portion of the air intake system of the vehicle of FIG. 1.
Figure 10:
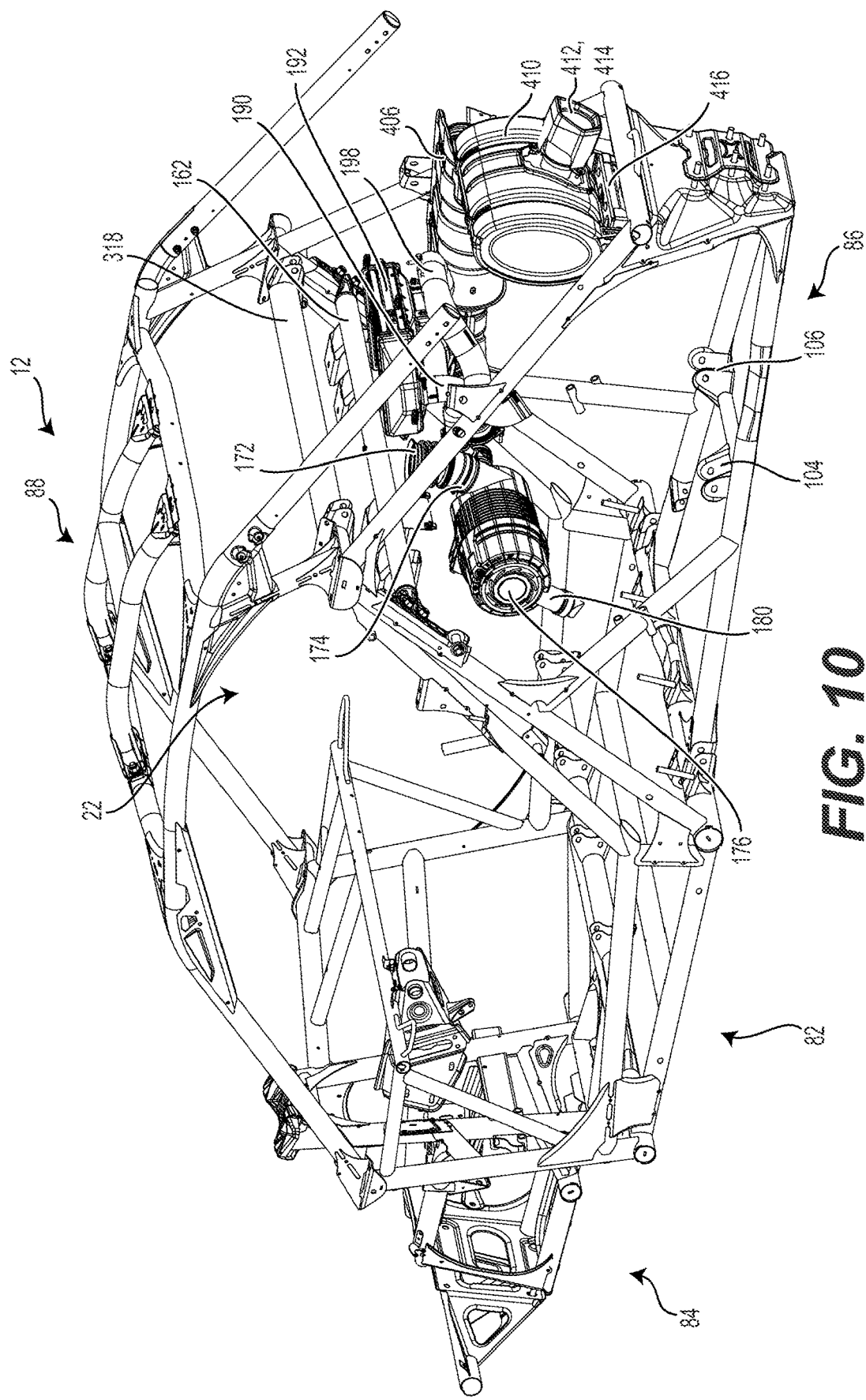
FIG. 10 is a perspective view taken from a rear, left side of the frame, a portion of the air intake system, and a portion of an exhaust system of the vehicle of FIG. 1.
Figure 12:
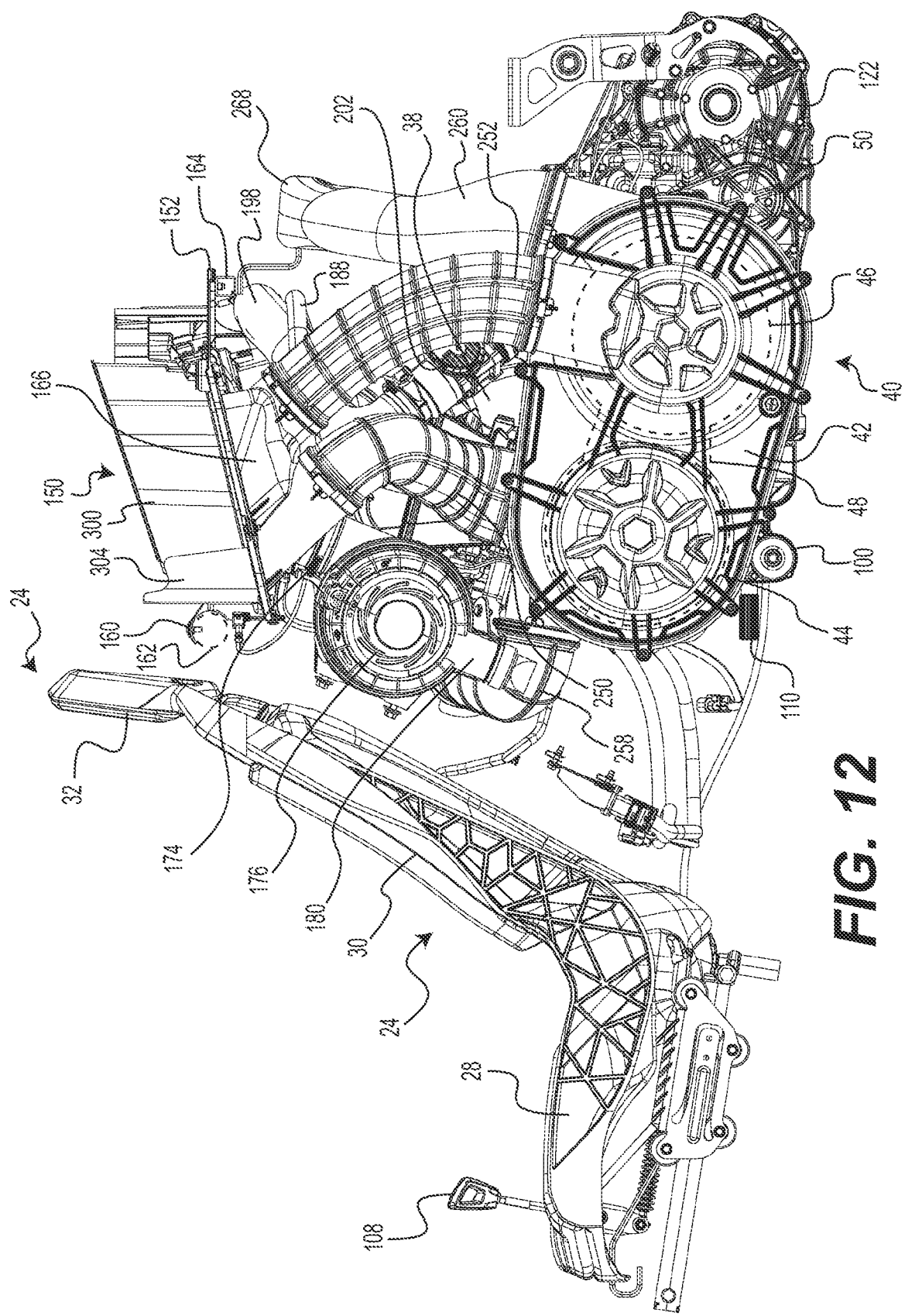
FIG. 12 is a left side elevation view of the components of FIG. 11.
Figure 21:
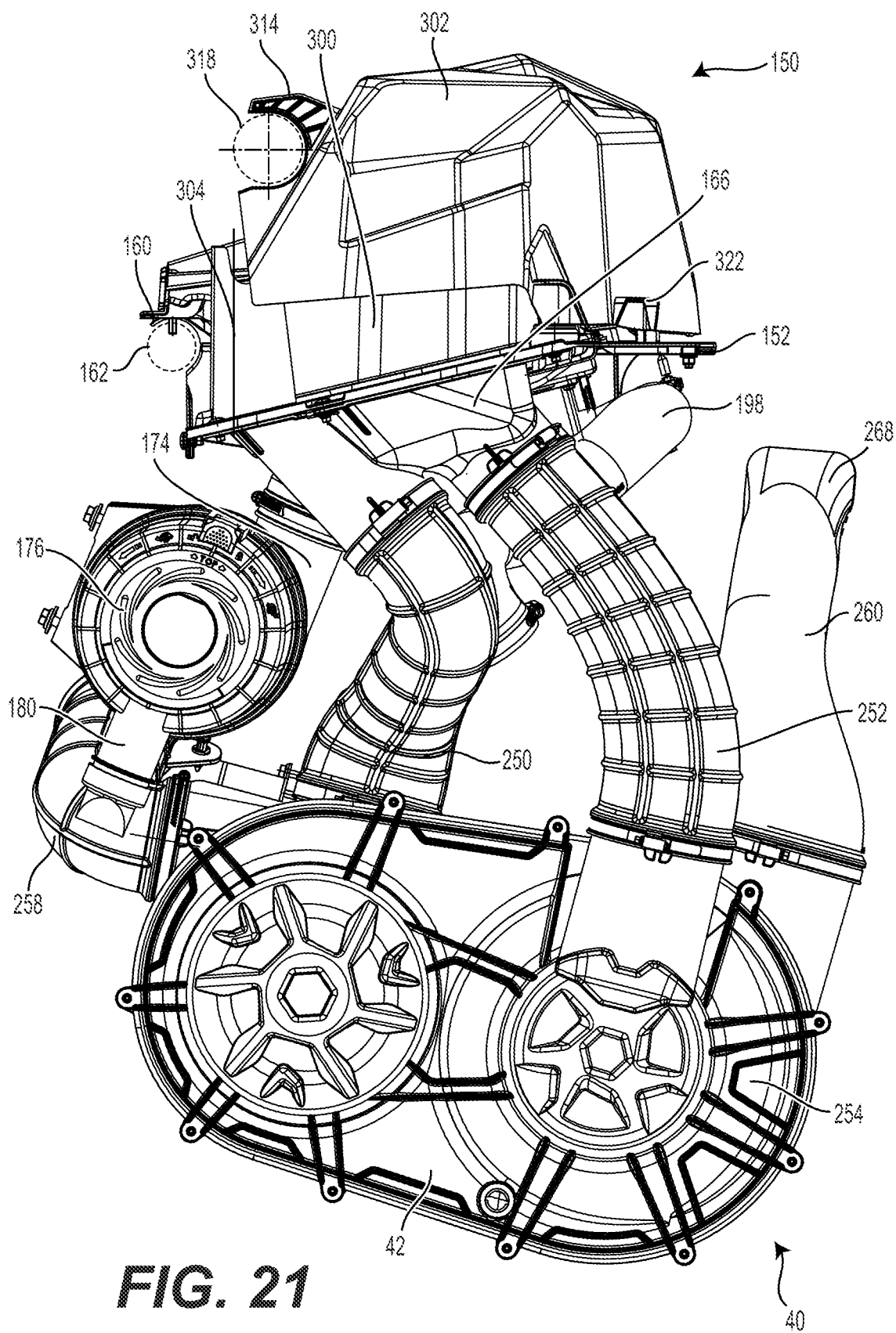
FIG. 21 is a left side elevation view of the components of FIG. 18.
Figure 22:
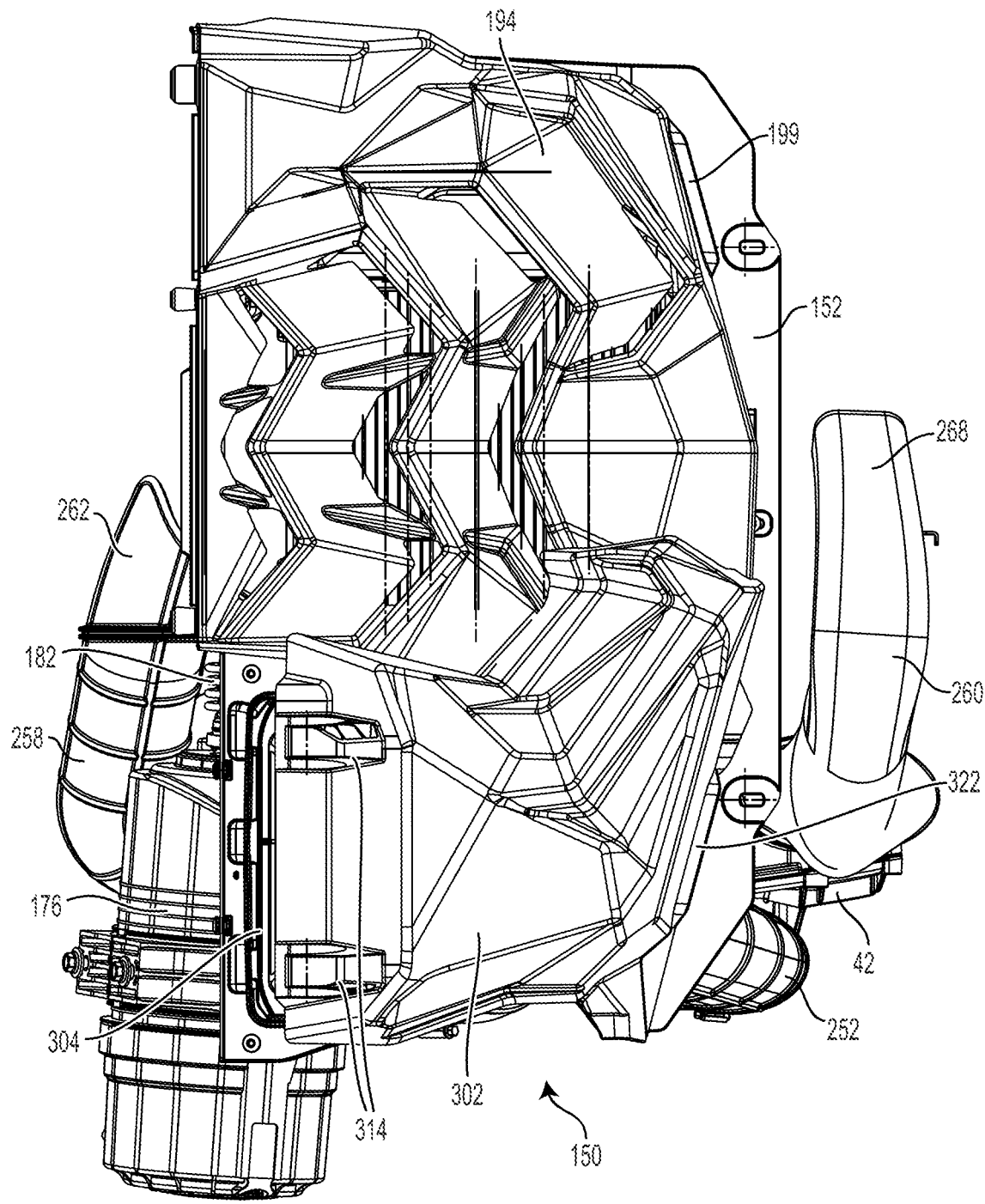
FIG. 22 is a top plan view of the components of FIG. 18.

As can be seen in FIGS. 7, 12 and 21, the base 152 has an arcuate tab 160 at a front thereof that is fastened to a laterally extending frame member 162 having a circular cross-section. The frame member 162 is disposed behind the headrests 32 of the seats 24, 26. As can be seen in FIGS. 6 to 9 and 12, the base 152 sits on and is fastened to a top of a laterally extending frame member 164 having a square cross-section.

Figure 18:
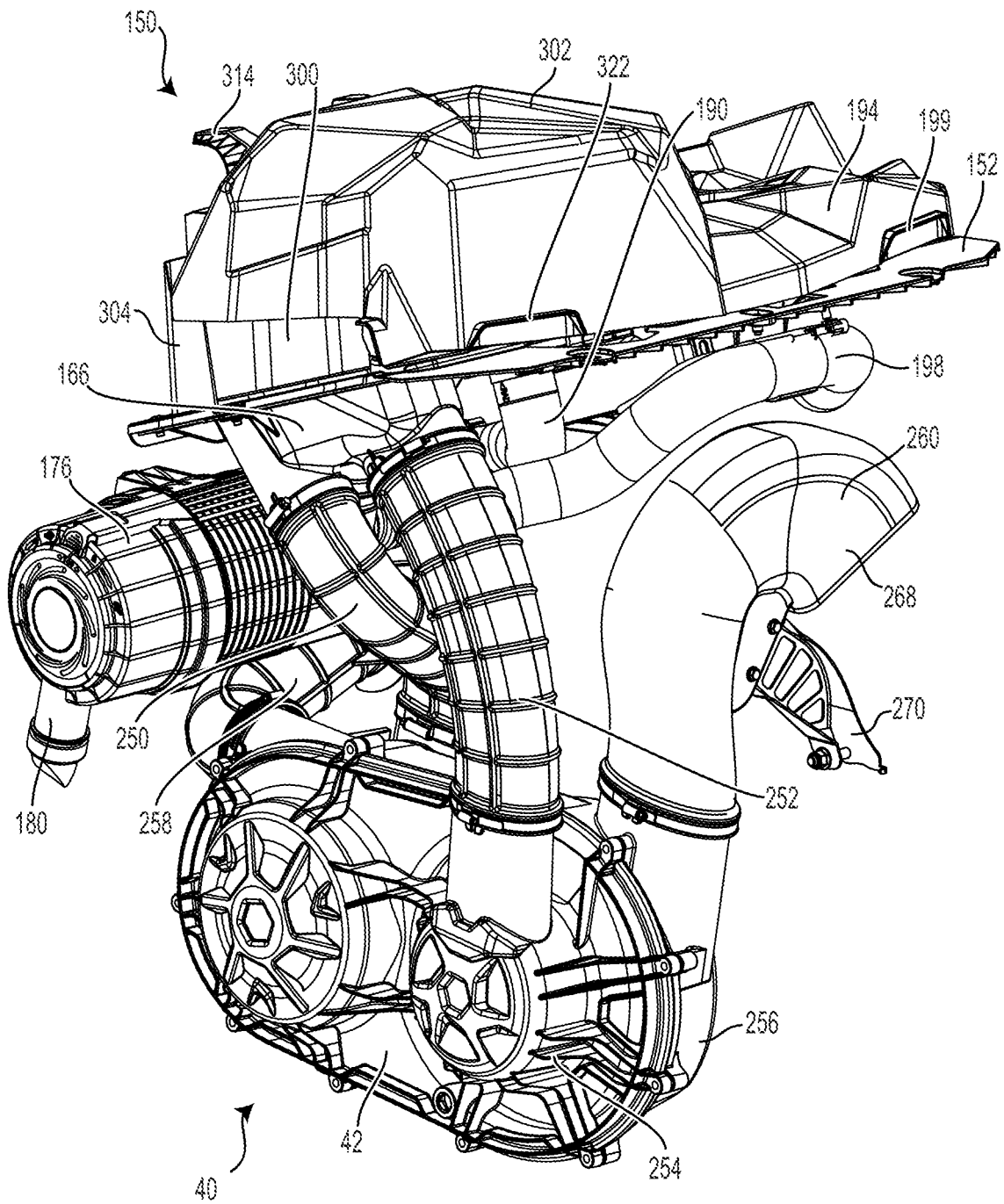
FIG. 18 is a perspective view taken from a rear, left side of the air intake system and the CVT of the vehicle of FIG. 1.
Figure 26:
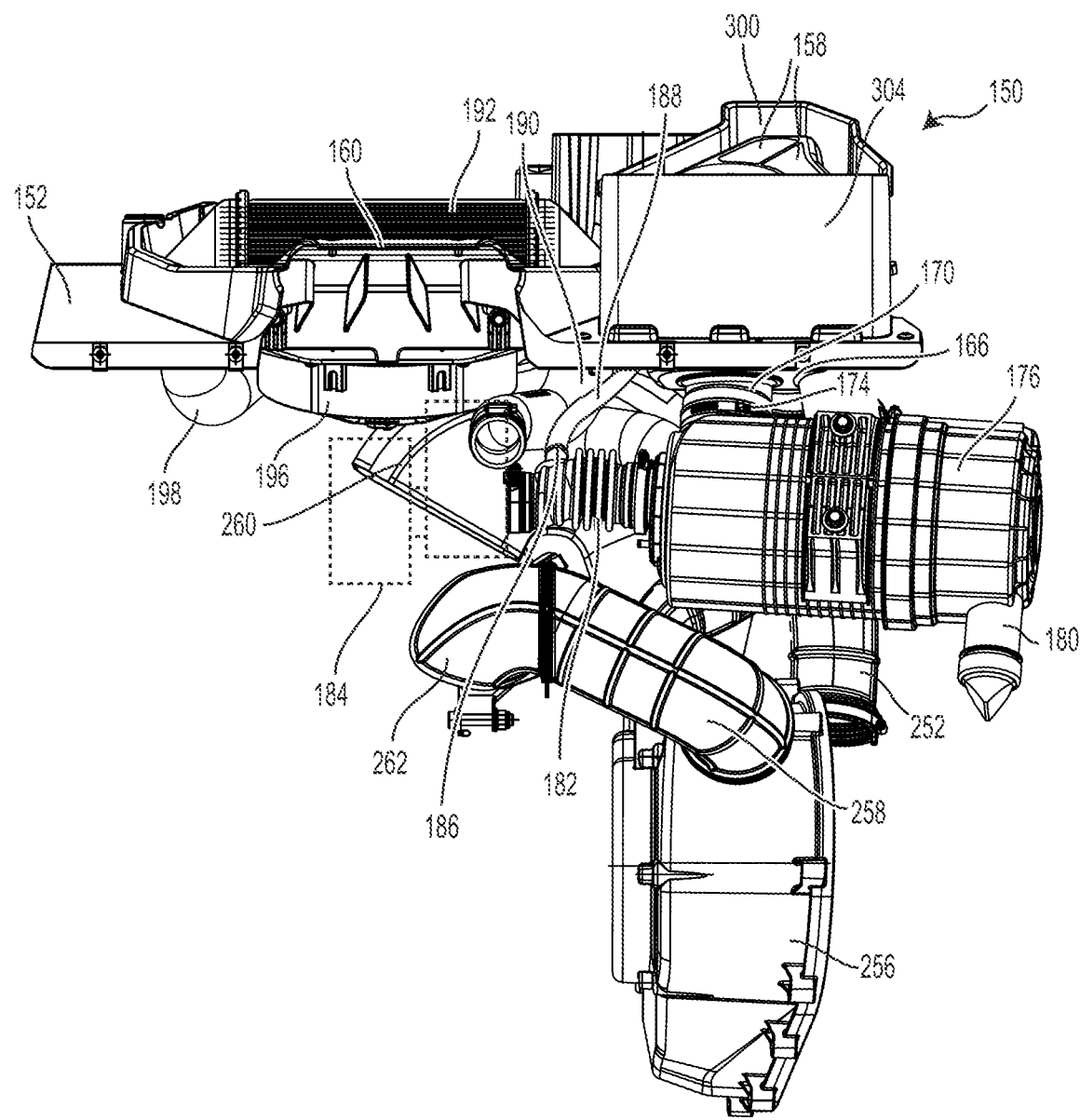
FIG. 26 is a front elevation view of the components of FIG. 25.
Figure 27:
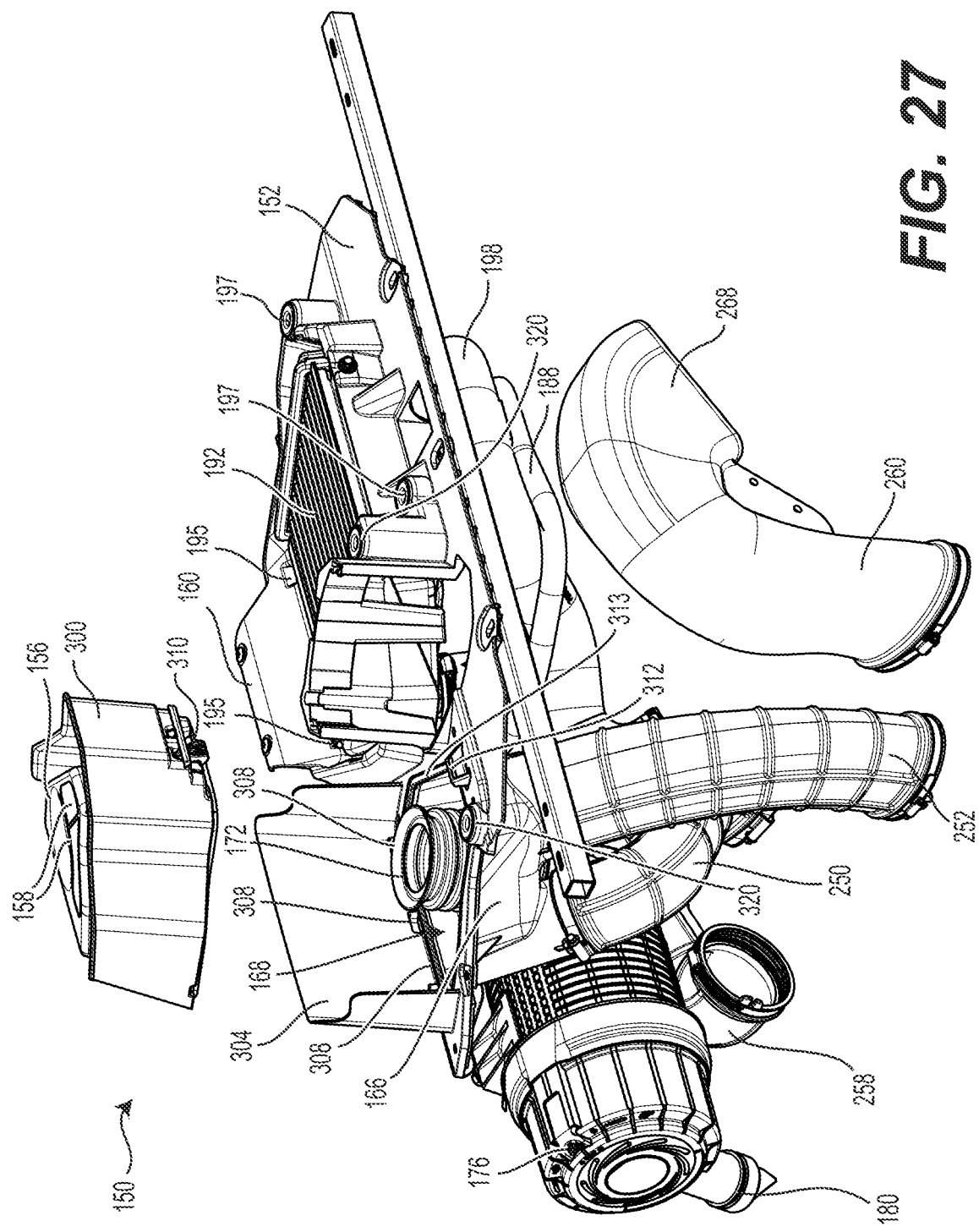
FIG. 27 is perspective view taken from a rear, left side of the components of FIG. 18 with the CVT, the cover of the air intake assembly and the cover of the intercooler removed and with a filter housing of the air intake assembly shown separated from a base.

As best seen in FIG. 18, the air intake assembly 150 has a downwardly extending recessed portion 166 extending below and connected to a bottom of the base 152. The recessed portion 166 defines a space 168. The recessed portion 166 defines an air intake assembly aperture 170 (FIG. 26). A filter housing 300 of the air intake assembly 150, described in greater detail below, sits on top of this space 168 above the air intake assembly aperture 170. As can be seen in FIG. 27, a compressible bellows 172 is provided in the space 168. The lower end of the bellows 172 is connected at its lower end around the air intake assembly aperture 170 and forms an air-tight seal around the air intake assembly aperture 170. When the filter housing 300 is installed on the base 152, the filter housing 300 compresses the bellows 172 and, as a result, the bellows 172 forms an air-tight seal around the air intake assembly aperture 156. Therefore, air entering the air intake assembly aperture 156 flows to the air intake assembly aperture 170 via the bellows 172 and does not leak into the space 168 around the bellows 172. Similarly, air in the space 168 does not leak into the bellows 172.

Returning to FIGS. 14 to 27, from the bellows 172 and the air intake assembly aperture 170, air flows into an air intake pipe 174 which extends downward and forward and enters through a top portion of an air filter housing 176 near a right end thereof. The air filter housing 176 is generally cylindrical and contains an air filter 178 (shown in dotted lines in FIG. 20). From its right end, the air filter housing 176 extends downward, forward and to the left. The air filter housing 176 is provided with a drain 180 at a lower left corner thereof, which is the lower portion of the air filter housing 176, to permit any debris that may have accumulated in the air filter housing 176 to be drained from the air filter housing 176. The air filter housing 176 is rigidly connected to the wall 78.

Figure 15:
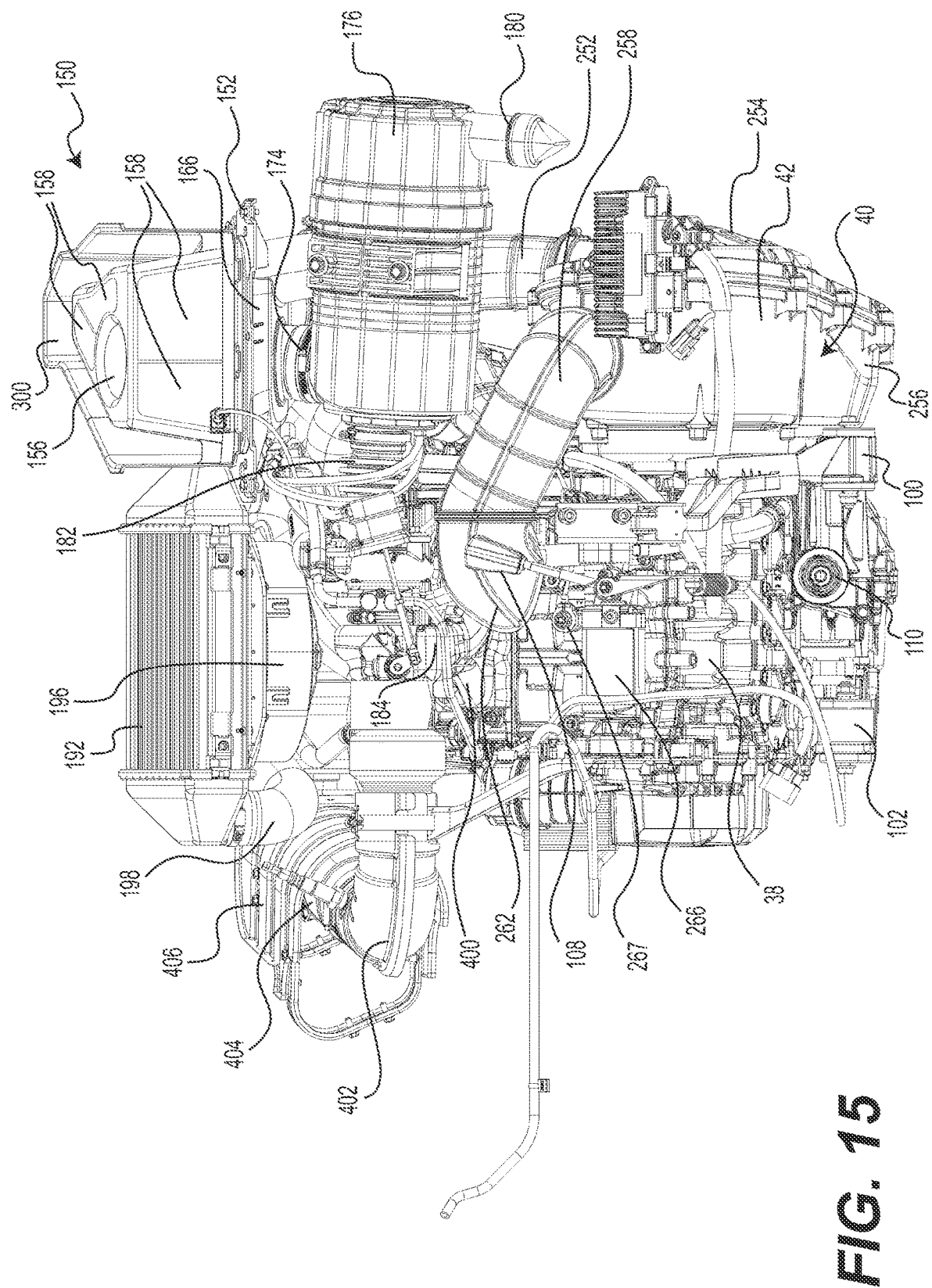
FIG. 15 is a front elevation view of the components of FIG. 14.

As best seen in FIG. 26, a flexible conduit 182 extends right from a right end wall of the air filter housing 176. The right end of the conduit 182 is connected to a turbocharger 184 (FIG. 15, schematically shown in dotted lines in FIGS. 20, 23, 24 and 26) such that air can flow from the filter housing 176 to the turbocharger 184. As can be seen in FIG. 26, from the air filter housing 176, the flexible conduit 182 goes up to an apex and then down to the turbocharger 184. A tube connector 186 extends upward and rearward from the section of the conduit 182 located between the apex of the conduit 182 and the turbocharger 184. A blow-by gas tube 188, best seen in FIGS. 26 and 27, is connected to the tube connector 186, extends under the base 152 around the engine 38 and then connects to a cylinder head of the engine 38 such that blow-by gases generated in the engine 38 are returned to the intake air to be supplied to the engine 38. By locating the tube connector 186 between the apex of the conduit 182 and the turbocharger 184, any oil entrained with the blow-by gases will flow in the conduit 182 toward the turbocharger 184 and not toward the air filter 178 in the air filter housing 176.

The turbocharger 184 is disposed in front of the cylinders of the engine 38 and is generally laterally centered relative to the engine 38. The turbocharger 184 is longitudinally between the engine 38 and the wall 78, and is therefore also longitudinally between the engine 38 and the seats 24, 26. The exhaust gases are supplied from the engine 38 to power a turbine of the turbocharger 184 that compresses the air supplied from the conduit 182 to the turbocharger 184.

Figure 11:
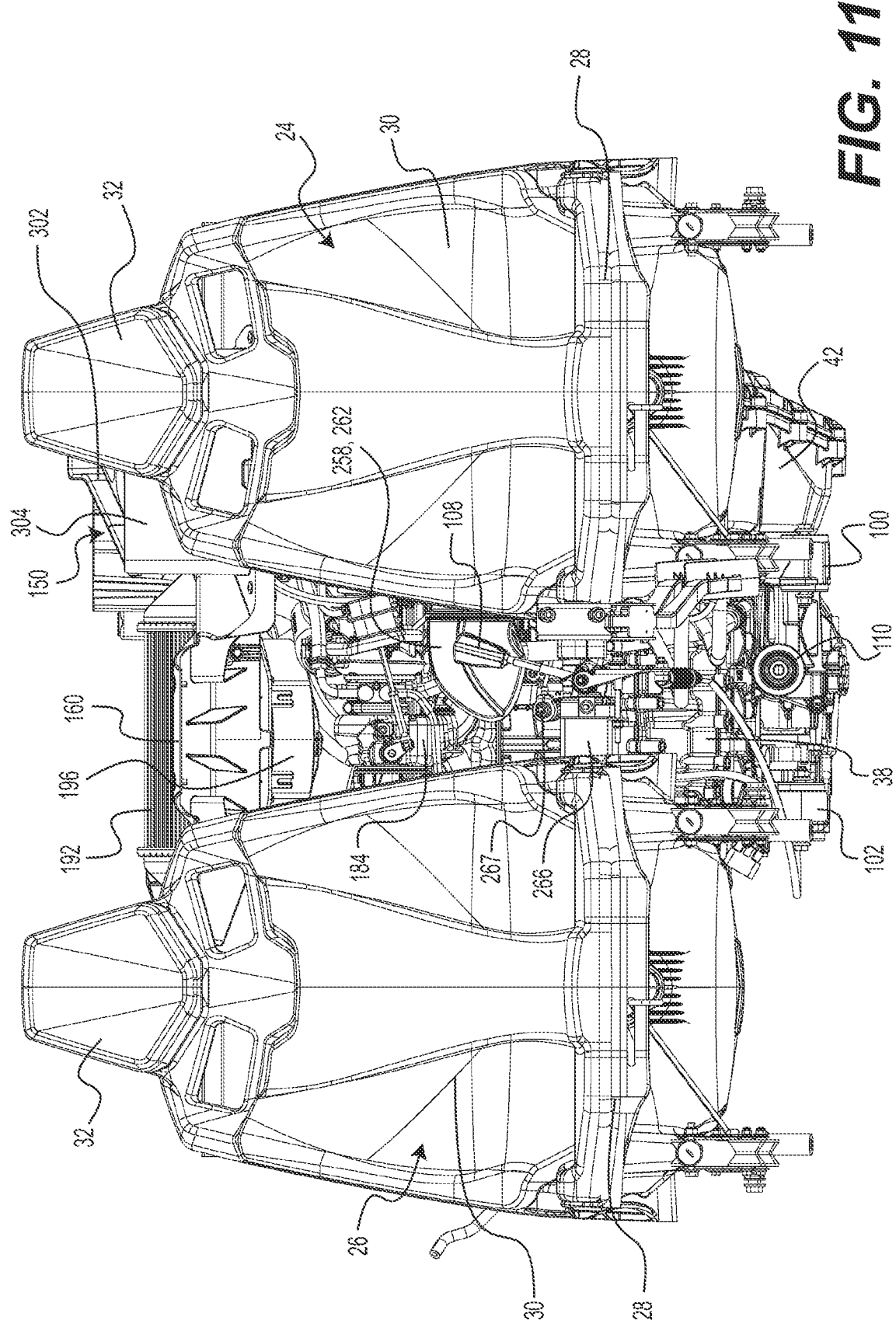
FIG. 11 is a front elevation view of seats, an engine and associated components of the engine of the vehicle of FIG. 1.
Figure 23:
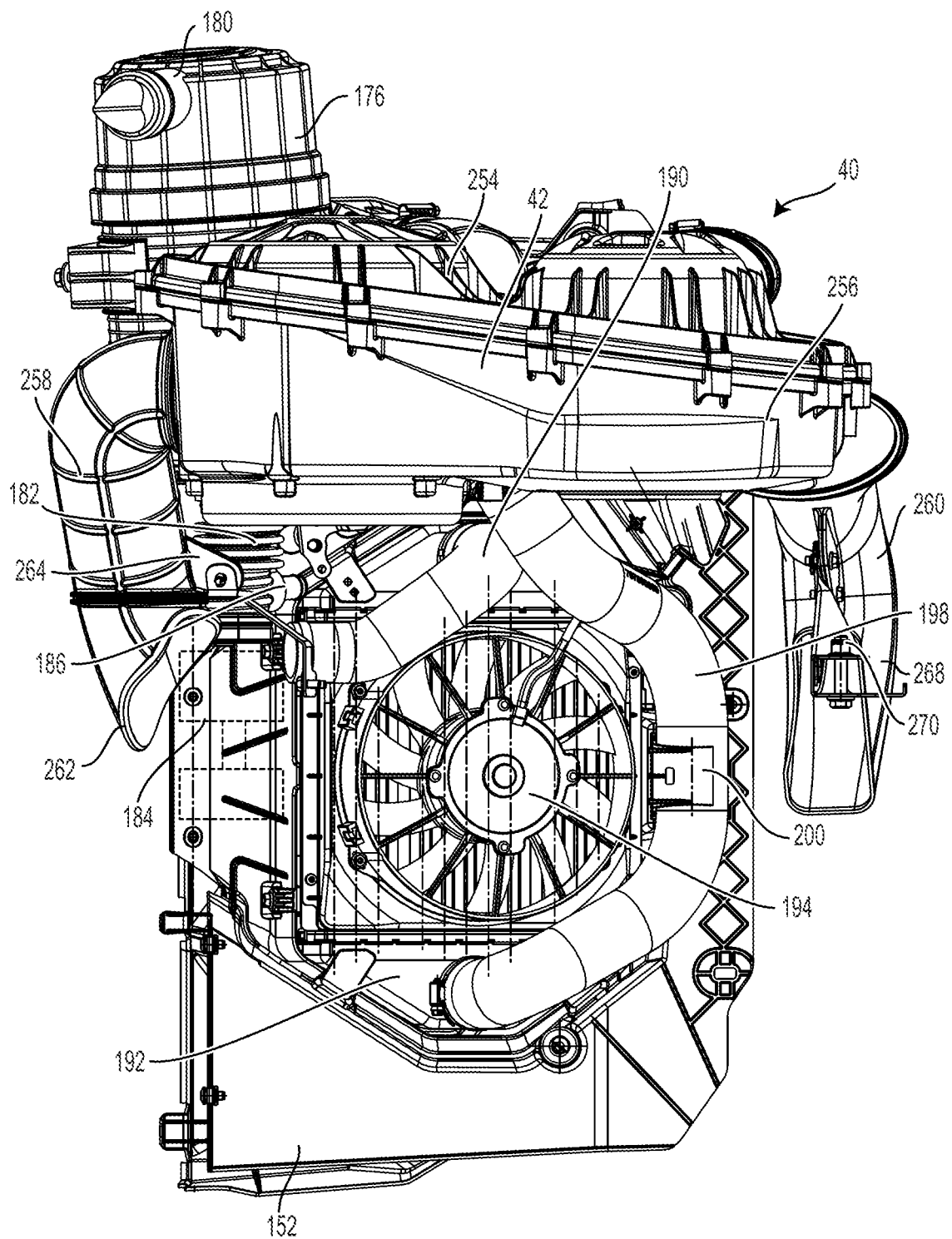
FIG. 23 is a bottom plan view of the components of FIG. 18.

From the turbocharger 184, air enters a pipe 190 that extends rearward, upward and toward the left and connects to a left side of an intercooler 192 as can be seen in FIG. 23. The intercooler 192 includes passages for the flow of air coming from the pipe 190 for cooling the air that has previously been heated in the turbocharger 184. The intercooler 192 is mounted on the base 152 to the right of the air intake assembly 150. The intercooler 192 is disposed at an angle such that its rear end is higher than its front end. The intercooler 192 is disposed rearward of the driver and passenger seats 24, 26. As can be seen in FIG. 11, a majority of the intercooler 192 is aligned laterally with the space defined between the seat backs 30 of the seats 24, 26. As such, when the vehicle 10 moves forward, the air passing between the seats 24, 26 flows through the intercooler 192 to assist in cooling the air flowing through the intercooler 192 from the pipe 190. A cover 194 is connected to the base 152 over the intercooler 192. The cover 194 has a plurality of forwardly facing inlets directing air toward the intercooler 192. The cover 194 is provided with two tongues 191 (FIG. 24) at the front thereof and two downwardly extending pins 193 (only one shown in FIG. 24) near a rear thereof. To install the cover 194, the tongues are inserted into grooves 195 formed behind the tab 160 (see FIG. 25). The cover 194 is then pivoted down such that the pins are received inside apertures defined by grommets 197 (FIG. 27) provided in the base 152, thereby retaining the cover 194 on the base 152. A handle 199 (FIG. 19) provided on the back of the cover 194 allows a user to lift the back of the cover 194 in order to remove the cover 194 from the base 152. A fan 196 is connected under the base 152 under the intercooler 192. An aperture (not shown) is defined in the base 152 between the intercooler 192 and the fan 196. The fan 196 generates an air flow through the intercooler 192 based on conditions related at least in part on a position of a throttle valve (not shown) of a throttle body 202 (FIGS. 12, 17) and on engine speed.

From the intercooler 192, air flows in a pipe 198 disposed on a right end of the intercooler 192 best seen in FIG. 23. The pipe 198 is disposed under the base 152. The pipe 198 has a first portion that extends downward from the intercooler 192, then rearward and toward the left to a second portion extending toward the left to a third portion that extends forward, toward the left and then downward. The second portion of the pipe 198 is connected to the base 152 by a clip 200 (FIG. 23). From the pipe 198, air enters the throttle body 202 (FIGS. 12, 17) which includes a throttle valve (not shown) to control the flow of air to the engine 38. The position of the throttle valve is determined at least in part by the position of the throttle pedal (not shown) disposed in front of the driver seat 24. From the throttle body 202, the air enters a plenum 204 (FIG. 17) extending laterally behind the cylinders of the engine 38. From the plenum 204, the air is supplied to the air intake ports of the engine 38.

Figure 24:
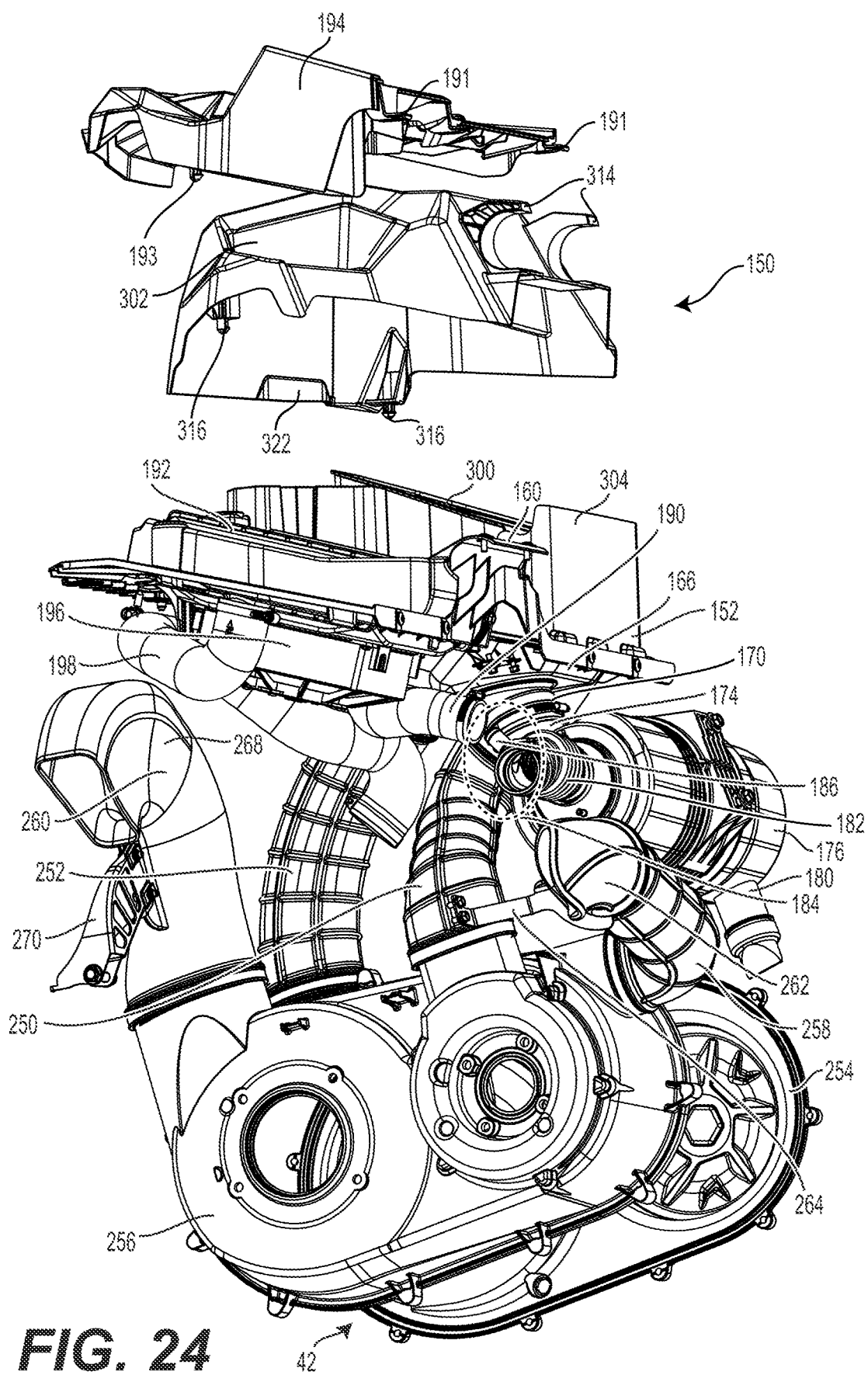
FIG. 24 is a partially exploded view of the components of FIG. 18 take from a front, right side with the pulleys and the belt of the CVT removed.
Figure 25:
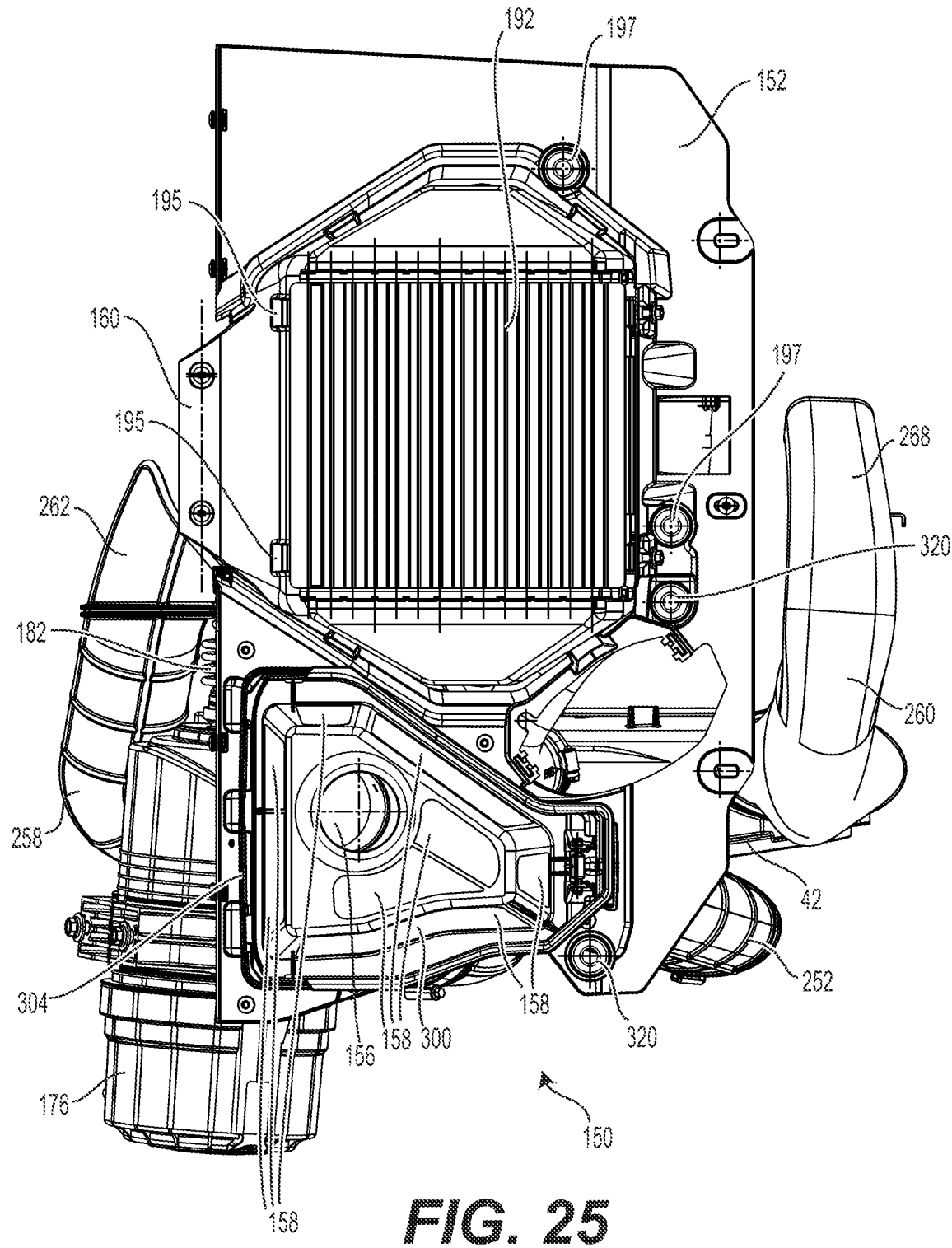
FIG. 25 is a top plan view of the components of FIG. 18 with a cover of an air intake assembly, a cover of an intercooler and a portion of the CVT removed.

As previously mentioned, the air intake assembly 150 has eight air intake assembly apertures 158. Air flowing out of the air intake assembly 150 via the air intake assembly apertures 158 flows into the space 168 under the filter housing 300. In order to cool the CVT 40, two CVT inlet conduits 250, 252 are connected between the recessed portion 166 of the air intake assembly 150 and the CVT housing 42 to supply air from the space 168 to an interior of the CVT housing 42. The CVT housing 42 is made of a left portion 254 and a right portion 256 that are fastened to each other and which can be separated from each other in order to install and perform maintenance on the CVT 40. The CVT inlet conduit 250 is connected to a front, bottom portion of the recessed portion 166 (see FIG. 21) and extends downward therefrom. As best seen in FIG. 24, the lower end of the CVT inlet conduit 250 connects to a CVT inlet in a top, front portion of the right portion 256 of the CVT housing 42 such that the outlet of the CVT inlet conduit 250 is in proximity to the primary pulley 44. As a result, air supplied by the CVT inlet conduit 250 flows over the primary pulley 44. The CVT inlet conduit 252 is connected to a rear, bottom portion of the recessed portion 166 (see FIG. 21) and extends downward therefrom. As can be seen in FIG. 21, the lower end of the CVT inlet conduit 252 connects to a CVT inlet in a top, rear portion of the left portion 254 of the CVT housing 42 such that the outlet of the CVT inlet conduit 252 is in proximity to the secondary pulley 46. As a result, air supplied by the CVT inlet conduit 252 flows over the secondary pulley 46.

To exhaust the air from the interior of the CVT housing 42, two CVT outlet conduits 258, 260 are connected to the CVT housing 42 and open to the atmosphere as best seen in FIG. 24. The highest points of CVT outlet conduits 258, 260 are vertically lower than the base 152, and are therefore vertically lower than the air intake assembly 150.

An inlet of the CVT outlet conduit 258 is connected to a CVT outlet in a top, front portion of the right portion 256 of the CVT housing 42 such that the inlet of the CVT outlet conduit 258 is in proximity to the primary pulley 44. From the right portion 256 of the CVT housing 42, the CVT outlet conduit 258 extends forward, then toward the right to a flared outlet portion 262 that extends rearward, rightward and slightly downward. The CVT outlet conduit 258 is supported by a bracket 264 (FIG. 24) connected to a front of the engine 38. The outlet portion 262 of the CVT outlet conduit 258 is oriented to generate a cooling air flow from the air flowing out of the CVT housing 42 via the CVT outlet conduit 262. The cooling air flow is an air flow resulting from and including the air coming out of the outlet portion 262 of the CVT outlet conduit 258 that cools components by withdrawing heat from them and/or by preventing heat from reaching these components. The cooling air flow cools at least a portion of the turbocharger 184 and components of the vehicle 10 that are nearby the turbocharger 184, some of which are described below. These components of the vehicle 10 are near enough to the turbocharger 184 to be heated by heat radiated from the turbocharger 184. In some implementations, the cooling air flow cools only the turbocharger 184 or only one or more of these components.

More specifically the outlet portion 262 of the CVT outlet conduit 258 directs the cooling air flow over a front of the engine 38, a portion of the turbocharger 184, a starter motor 266 (FIG. 15) of the engine 38 that is mounted to a front of the engine 38, and a knock sensor 267 of the engine 38 that is also mounted to the front of the engine 38. As a result, the cooling air flow generated by air flowing out of the CVT outlet conduit 258 cools these components. The engine 38, the turbocharger 184, the starter motor 266 and the knock sensor 267 are all disposed at least in part rearward of the outlet portion 262 of the CVT outlet conduit 258.

An inlet of the CVT outlet conduit 260 is connected to a CVT outlet in a top, rear portion of the right portion 256 of the CVT housing 42 such that the inlet of the CVT outlet conduit 260 is in proximity to the secondary pulley 44. From the right portion 256 of the CVT housing 42, the CVT outlet conduit 260 extends upward to an arcuate outlet portion 268 that extends upward, rightward and then slightly downward. The CVT outlet conduit 260 is supported by a bracket 270 (FIG. 18) connected to the transaxle 50. The outlet portion 268 of the CVT outlet conduit 260 is oriented to direct air flowing out of the CVT outlet conduit 260 over the transaxle 50 and a portion of the exhaust system of the engine 38 as will be described below. As a result, the air flowing out of the CVT outlet conduit 260 cools these components.

In an alternative implementation illustrated in FIGS. 36 to 41, the CVT outlet conduit 258 has been replaced by a CVT outlet conduit 500. The CVT outlet conduit 500 has a pipe 502, an air box 504, and an outlet portion in the form of an outlet scoop 506.

Figure 39:
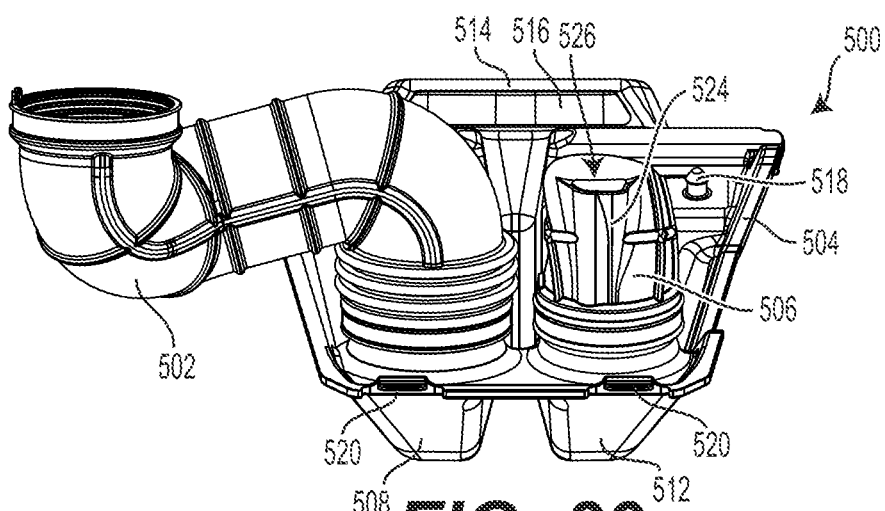
FIG. 39 is a bottom view of the CVT outlet conduit of FIG. 37.

An inlet of the pipe 502 is connected to the CVT outlet in the top, front portion of the right portion 256 of the CVT housing 42. From the right portion 256 of the CVT housing 42, the pipe 50 extends forward and rightward and connects to an inlet of the air box 504. The air box 504 defines an inverted generally U-shaped passage having a left vertical branch 508, a horizontal branch 510, and a right vertical branch 512. The inlet of the air box 504 is disposed at a bottom of the left vertical branch 508. The air box 504 also has a protrusion 514 extending rearward from a top thereof from the horizontal branch 510. The protrusion 514 defines a generally downwardly facing outlet 516 (FIG. 39). The air box 504 shields the outlet 516 from incoming dust and/or water, as the case may be, as the vehicle 10 moves forward.

Figure 40:
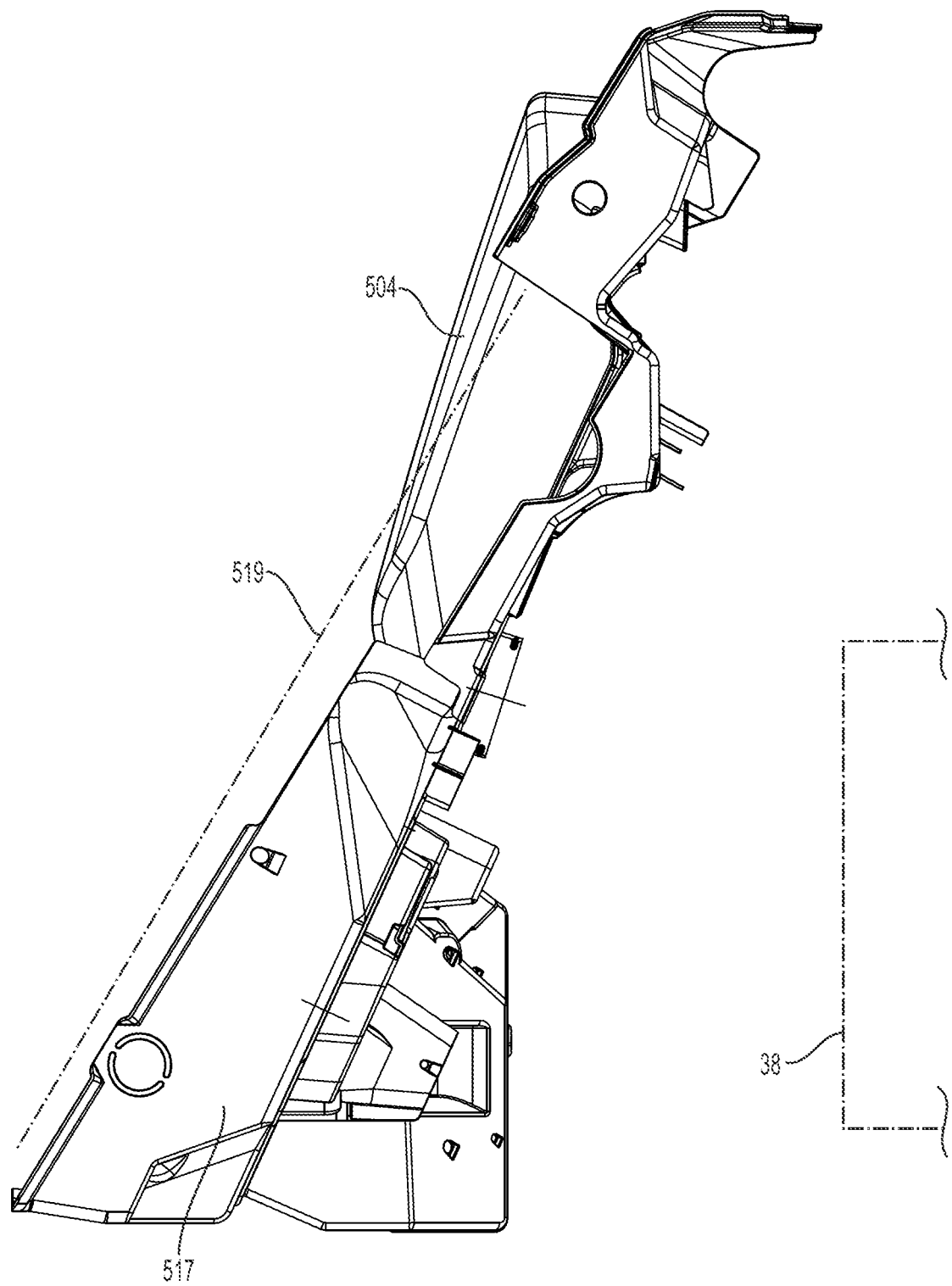
FIG. 40 is a left side elevation view of an air box of the CVT outlet conduit of FIG. 37 mounted to an alternative implementation of the separation wall of the vehicle of FIG. 1, with a rear surface of the driver seat and a front portion of the engine illustrated schematically.
Figure 41:
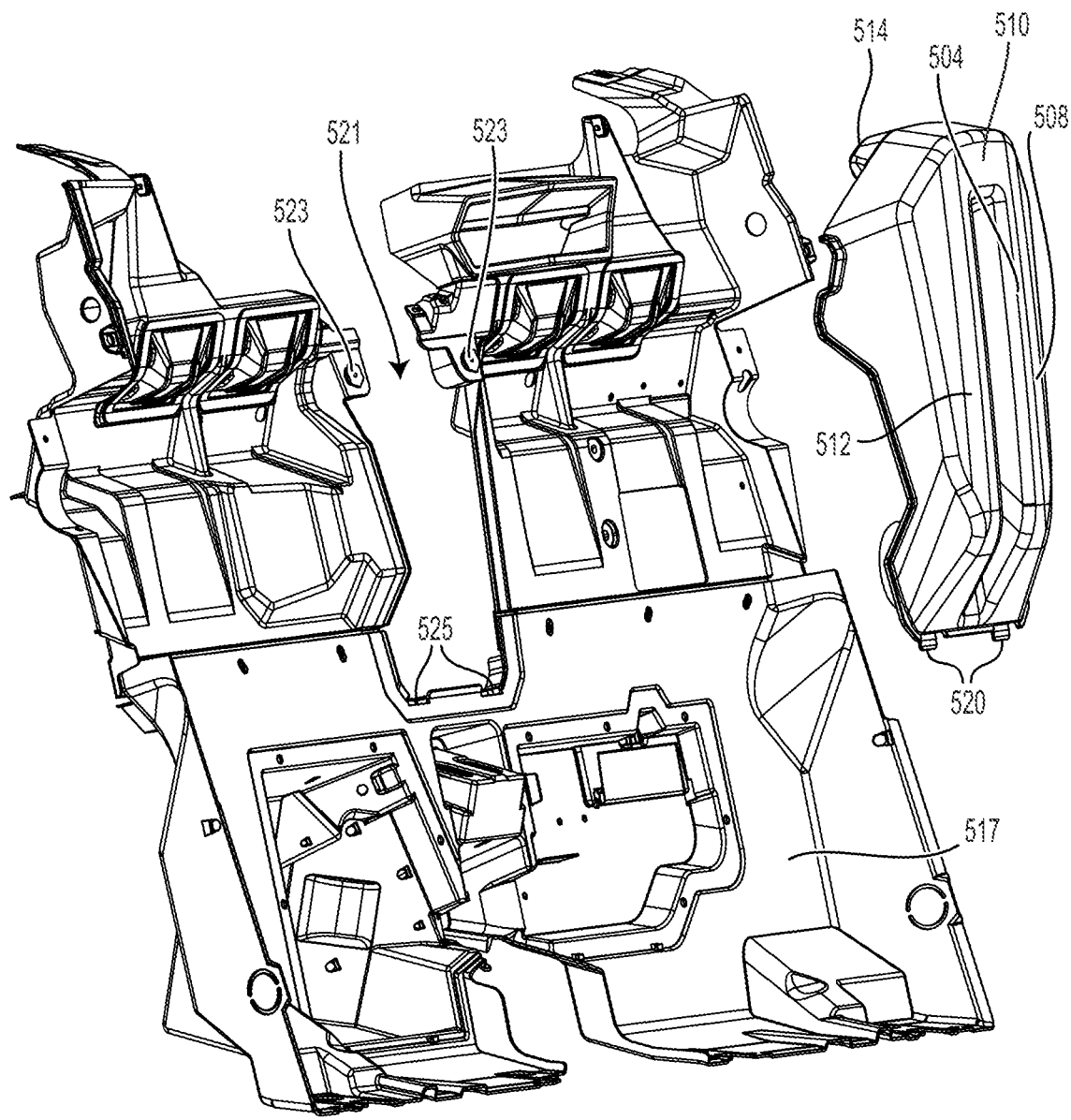
FIG. 41 is a perspective view taken from a front, right side of the air box and separation wall of FIG. 40, with the air box disconnected from the separation wall.

As shown in FIG. 40, the air box 504 is mounted to a front of a separation wall 517 disposed longitudinally between the seats 24, 26 (the rear side of the driver seat 24 being schematically by line 519 in FIG. 40) and the engine 38, which is an alternative implementation of the separation wall 78 described above. As can also be seen in FIG. 40, part of the air box 504 is disposed longitudinally between the seats 24, 26 (i.e. line 519) and the separation wall 517, and the separation wall 517 is disposed longitudinally between the air box 504 and the engine 38. A majority of the air box 504 is disposed in the cockpit area 22. The air box 504 is connected to the separation wall 517 along a lateral center thereof so a to cover a recess 521 (FIG. 41) defined by the separation wall 517. The recess 521 and the air box 504 are disposed laterally between the seats 24, 26. The air box 504 has a pair of pins 518 (FIG. 37) that are received in a pair of grommets 523 (FIG. 41) provided in the separation wall 517 on either side of the recess 521 so as to connect the air box 504 to the separation wall 517. The air box 504 is also supported by a pair of tabs 520 extending from a bottom thereof that are received in corresponding notches 525 defined in the separation wall 78 along the bottom edge of the recess 521. The pipe 502 and the outlet scoop 506 both pass through the recess 521 to connect to the air box 504.

The outlet scoop 506 is connected to an outlet of the air box 504 disposed at a bottom of the right vertical branch 512. The outlet scoop 506 extends generally rearward from the outlet of the air box 504. The outlet scoop 506 defines a primary outlet 522 and has a downwardly extending bypass channel 524 defining a secondary outlet 526.

During operation, air flows out of the CVT housing 42, flow through the pipe 502 and into the left vertical branch 508 of the air box 504. Air then flows upward in the left vertical branch 508 and into the horizontal branch 510. From the horizontal branch 510, some air flows out to the atmosphere via the outlet 516 and some air flows downward in the right vertical branch 512. From the right vertical branch 512, air flows into the outlet scoop 506 and out to the atmosphere via the primary and secondary outlets 522, 526. The primary and secondary outlets 522, 526 are oriented to generate cooling air flows from the air flowing out of the CVT housing 42 via the CVT outlet conduit 500. As would be understood, air flowing out of the secondary outlet 526 flows more downward than the air flowing out of the primary outlet 522. More specifically the primary outlet 522 directs the cooling air flow over the front of the engine 38 and a portion of the turbocharger 184, and the secondary outlet 526 directs the cooling air flow over the front of the engine 38, the starter motor 266 and the knock sensor 267. As a result, the cooling air flows generated by air flowing out of the CVT outlet conduit 500 via the outlet scoop 506 cool these components.

In the event that the vehicle 10 is operated so as to become partially submerged in water and that the water level is above the outlet scoop 506, air can still exhaust to the atmosphere via the outlet 516. The inverted generally U-shape defined by the branches 508, 512, 514 also prevent water from flowing from the outlet scoop 506 into the CVT housing 42 as long as the water level remains below the outlet 516.

Turning now to FIGS. 20, 21, 24, and 27, the air intake assembly 150 will be described in more detail. As previously mentioned, the air intake assembly 150 is mounted to the base 152. The air intake assembly 150 includes the recessed portion 166, a filter housing 300 and a cover 302. The filter housing 300 defines the air intake assembly aperture 156 and the air intake assembly apertures 158.

The filter housing 300 is mounted to the base 152 behind a vertical wall 304 integrally formed with the base 152. To secure the front of the filter housing 300 to the base 152, the filter housing 300 is provided with three tongues 306 (see FIG. 29) extending from a lower front portion thereof that are inserted into three grooves 308 (FIG. 27) formed in the base of the wall 304. It is contemplated that more or less than three tongues 306 and three grooves 308 could be provided. To connect the rear of the filter housing 300 to the base 152, the filter housing 300 is provided with a latch 310 that is releasably connected to a horizontal bar 312 (FIG. 27, shown connected in FIG. 16) that is connected to the base 152. The base 152 has a recessed edge 313 around the top of the recess to receive a seal 358 (FIG. 32) at the bottom of the filter housing 300 to provide a seal between the bottom of the filter housing 300 and the space 168. It is contemplated that the filter housing 300 could be connected to the base 152 through other means.

Figure 19:
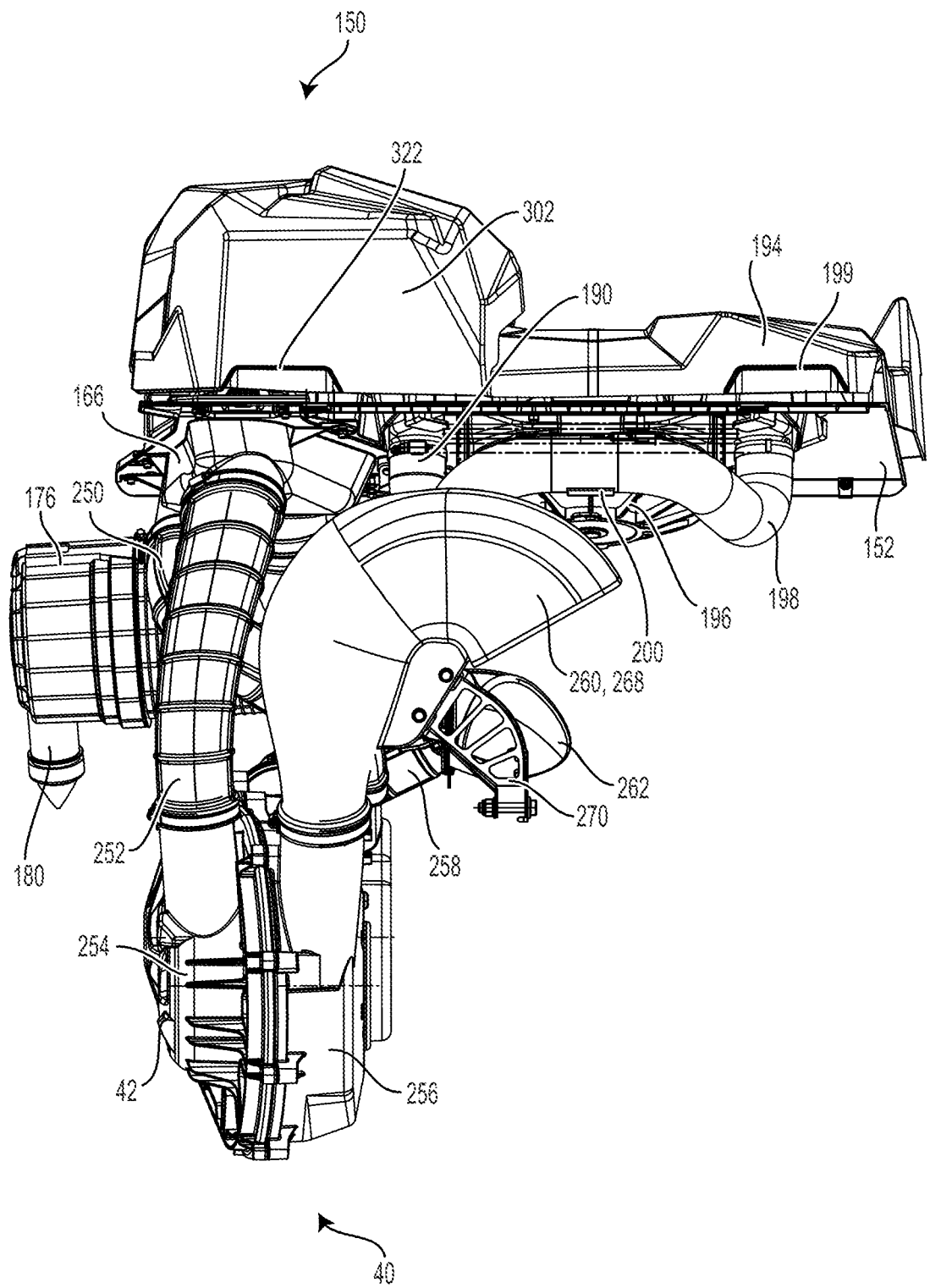
FIG. 19 is a rear elevation view of the components of FIG. 18.

The cover 302 is provided with two hooks 314 at the front thereof and two downwardly extending pins 316 (FIG. 24) near a rear thereof. To install the cover 302, the hooks 314 are placed over a laterally extending frame member 318 having a circular cross-section (see FIG. 7). The frame member 318 is disposed behind the headrests 32 of the seats 24, 26 above the frame member 162. The cover 302 is then pivoted down about the frame member 318 such that the pins 316 are received inside apertures defined by grommets 320 provided in the base 152. As a result, the cover 302 is secured to the base 152. A handle 322 provided on the back of the cover 302 allows a user to lift the back of the cover 302 in order to remove the cover 302 from the base 152. As can be seen in FIG. 19, the cover 302 extends partially over the cover 194 of the intercooler 192. As such, the cover 194 must be installed before the cover 302 and the cover 302 must be removed before the cover 194.

Figure 20:
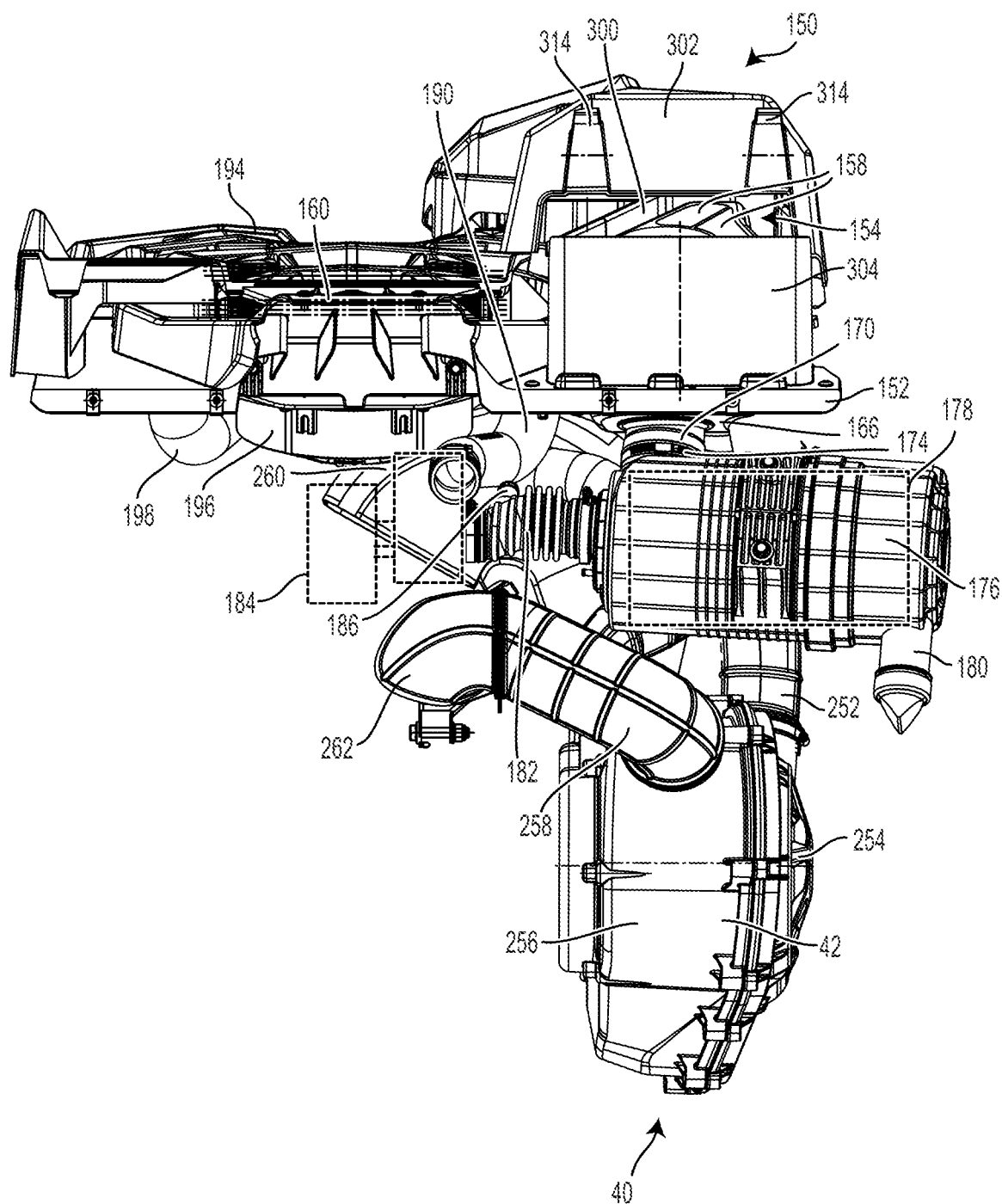
FIG. 20 is a front elevation view of the components of FIG. 18.

As can be seen in FIGS. 20 and 21, when installed, the cover 302 partially extends down over the left, right and rear sides of the filter housing 300. However, since the cover 302 does not extend down to the base 152 and since there is a space between the top, left side, right side and rear side of the filter housing 300 and the corresponding sides of the cover 302, air can enter the air intake assembly 150 via this space, thus forming an air inlet of the air intake assembly 150. The path taken by the air to enter the air intake assembly 150 via this space is tortuous. The air must go under the lower edge of the cover 302 then up between the filter housing 300 and the cover 302, thus separating some of the water and dust that may be present in the air. As can be see in FIG. 20, a space is defined above the front of the filter housing 300 between the top edge of the wall 304 and the front portion of the cover 302, thus forming the air inlet 154 that faces generally forward. As should be understood by looking at FIGS. 3, 11 and 12 in combination with FIG. 20, the air inlet 154 is disposed rearward of the headrest 32 of the driver seat 24 and is partially vertically and laterally aligned with this headrest 32. As a result, the headrest 32 of the driver seat 24 partially shields the air inlet 154 from incoming dust and/or water, as the case may be, as the vehicle 10 moves forward. Also, since other portions of the air intake assembly 150 are positioned behind the headrest 32 of the driver seat 24, this headrest 32 also partially shields the air inlet formed between the sides and rears of the filter housing 300 and the cover 302 from incoming dust and/or water, as the case may be, as the vehicle 10 moves forward.

Figure 28:
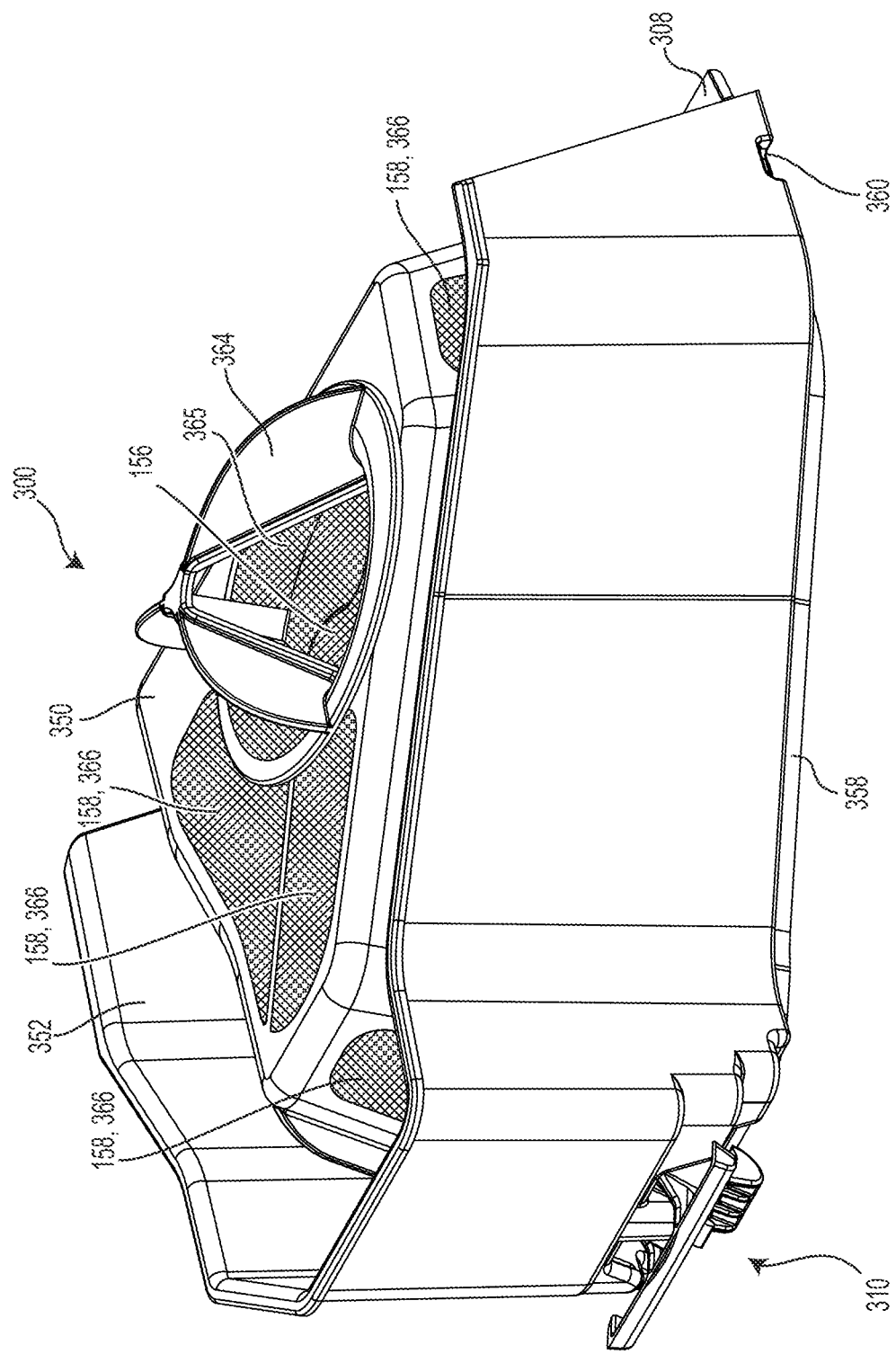
FIG. 28 is a perspective view taken from a rear, right side of the filter housing of the air intake assembly with filters and a grating provided thereon.
Figure 29:
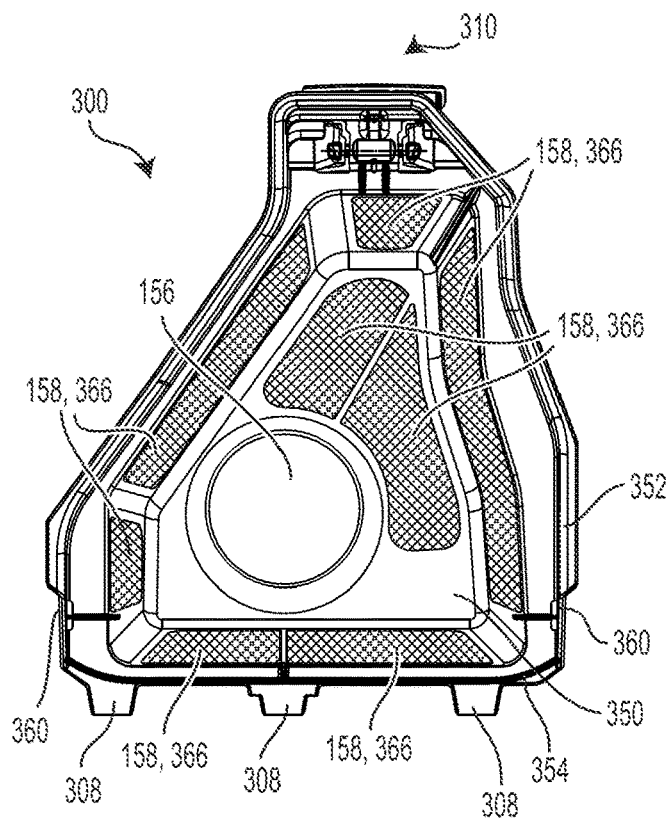
FIG. 29 is a top plan view of the filter housing of FIG. 28 with the filters.
Figure 30:
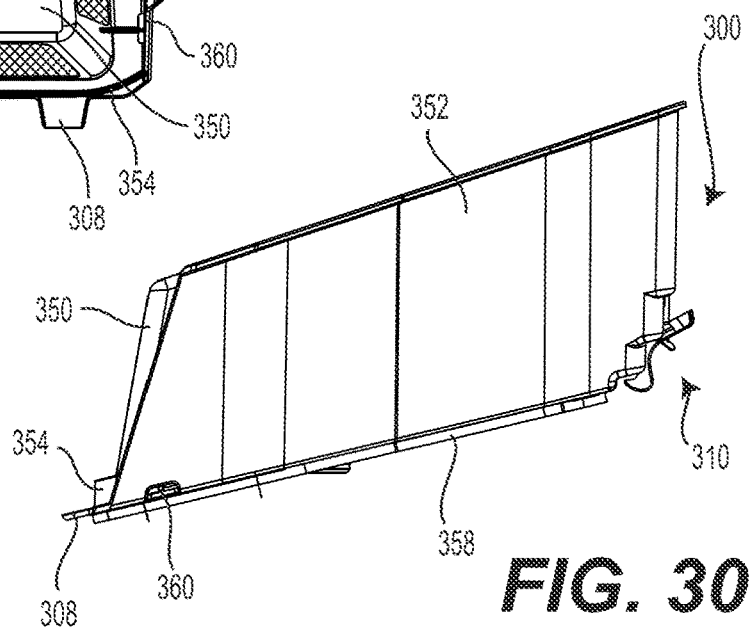
FIG. 30 is a left side elevation view of the filter housing of FIG. 28.
Figure 31:
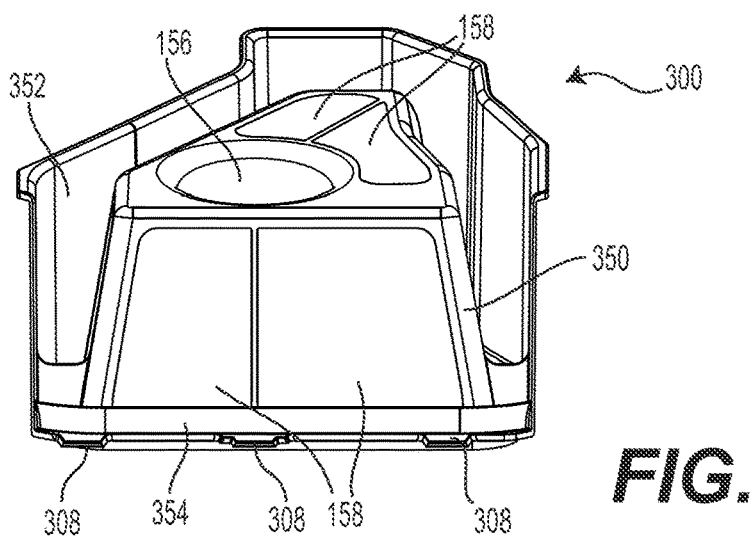
FIG. 31 is a front elevation view of the filter housing of FIG. 28.

Turning now to FIGS. 28 to 34, the filter housing 300 will be described in more detail. The filter housing 300 has a central raised portion 350, a vertical wall 352 that extends on its left, right and rear sides, a vertical front lip 354 that extends on its front side, and a floor 356. The floor 356 extends between the bottom left, right and rear sides of the raised portion 350 and the bottom of the wall 352 and between the bottom of the front side of the raised portion 350 and the bottom of the front lip 354. FIG. 30 shows the filter housing 300 as it is oriented when it is installed on the base 152. As can be seen, the floor 356 slants down from its rear to its front. A seal 358 is connected to the bottom of the floor 356. The seal 358 abuts the recessed edge 313 (FIG. 27) when the filter housing 300 is connected to the base 152. Drain apertures 360 are provided in the bottom front portions of the left and right sides of the wall 352 to permit the evacuation of water that may collect on the floor 356.

As can be seen in FIG. 29, the filter housing 300 tapers toward its rear. The lip 354 is much shorter than the wall 352 so as not to impede the flow of air into the filter housing 300 and into the air intake assembly apertures 156, 158. The previously mentioned tongues 308 extend from the floor 356 forward of the lip 354. The previously mentioned latch 310 is connected to the back of the wall 352.

As can be seen, the central raised portion 350 tapers slightly toward its top. The central raised portion 350 defines the air intake assembly apertures 156, 158. The air intake assembly aperture 156 is circular and is defined in a top of the central raised portion 350 near a front thereof. A tube 362 (FIG. 32) extends inside the central raised portion 350 downward from the air intake assembly aperture 156. When the filter housing 300 is installed on the base 152, the top edge of the flexible bellows 172 (FIG. 27) abuts the lower edge of the tube 362 and forms a seal with it. Air flowing inside the air intake assembly aperture 156, then flows in the tube 362, then in the flexible bellows 172 and then through the various components mentioned above to then enter the air intake ports of the engine 38 as mentioned above. In FIG. 28, a grating 364 is provided over the air intake assembly aperture 156. The grating 364 helps prevent large debris from entering into the air intake assembly aperture 156. The grating 364 also includes a screen filter 365 to filter the air passing through the air intake assembly apertures 156. It is contemplated that the grating 364 could be omitted. Two air intake assembly apertures 158 are defined in the top of the central raised portion 350. These two air intake assembly apertures 158 follow a portion of the contour of the air intake assembly aperture 156 and extend rearward therefrom. The other six air intake assembly apertures 158 are defined in the sides, front and back of the central raised portion 350. Screen filters 366 are connected to the air intake assembly apertures 158 to filter the air passing through the air intake assembly apertures 158. The screen filters 366 are removable to permit their replacement. Once the air passes through the filters 366 and the air intake assembly apertures 158, it flows inside the space 168 in the base 152 (FIG. 27), then flows to the interior of the CVT housing 42 and then out to the atmosphere as described above. In one implementation, the screen filters 365, 366 are made of a hydrophobic mesh material to prevent not only dust but also at least a portion of water contained in the air from passing through the air intake assembly apertures 156, 158. One example of such a hydrophobic mesh material is Nitex™. Other materials and types of filters are contemplated.

FIG. 35 illustrates a filter housing 600 that is an alternative implementation of the filter housing 300. The filter housing 600 is the same as the filter housing 300 except that the grating 364 and screen filter 365 have been replaced by a cover 602 and screen filters 604. As such, features of the filter housing 600 that are the same as those of the filter housing 300 have been labeled with the same reference numerals and will not be described again herein. Note that even though the latch 310 does not appear in FIG. 35, the filter housing 600 is provided with a latch 310 like the one of the filter housing 300.

The cover 602 is disposed over the air intake assembly aperture 156 and is fastened to the top of the central raised portion 350 by three fasteners 606 (two of which can be seen in FIG. 35). The cover 602 is removable to permit its cleaning and/or replacement. The cover 602 has a top defining a top aperture 608 and five lateral sides each defining a side aperture 610. The top aperture 608 is separated in multiple sections by reinforcing ribs 612 of the cover 602. The screen filters 604 are connected to the top and side apertures 608, 610 to filter the air before it flows to the intake assembly aperture 156. In one implementation, the screen filters 604 are made of a hydrophobic mesh material to prevent not only dust but also at least a portion of water contained in the air from passing through the air intake assembly aperture 156. One example of such a hydrophobic mesh material is Nitex™. Other materials and types of filters are contemplated. It is also contemplated that a single screen filter 604 having a shape complementary to the shape of the cover 602 could be provided inside the cover 602. It is also contemplated that the cover 602 and the screen filters 604 could be integrally formed.

Figure 14:
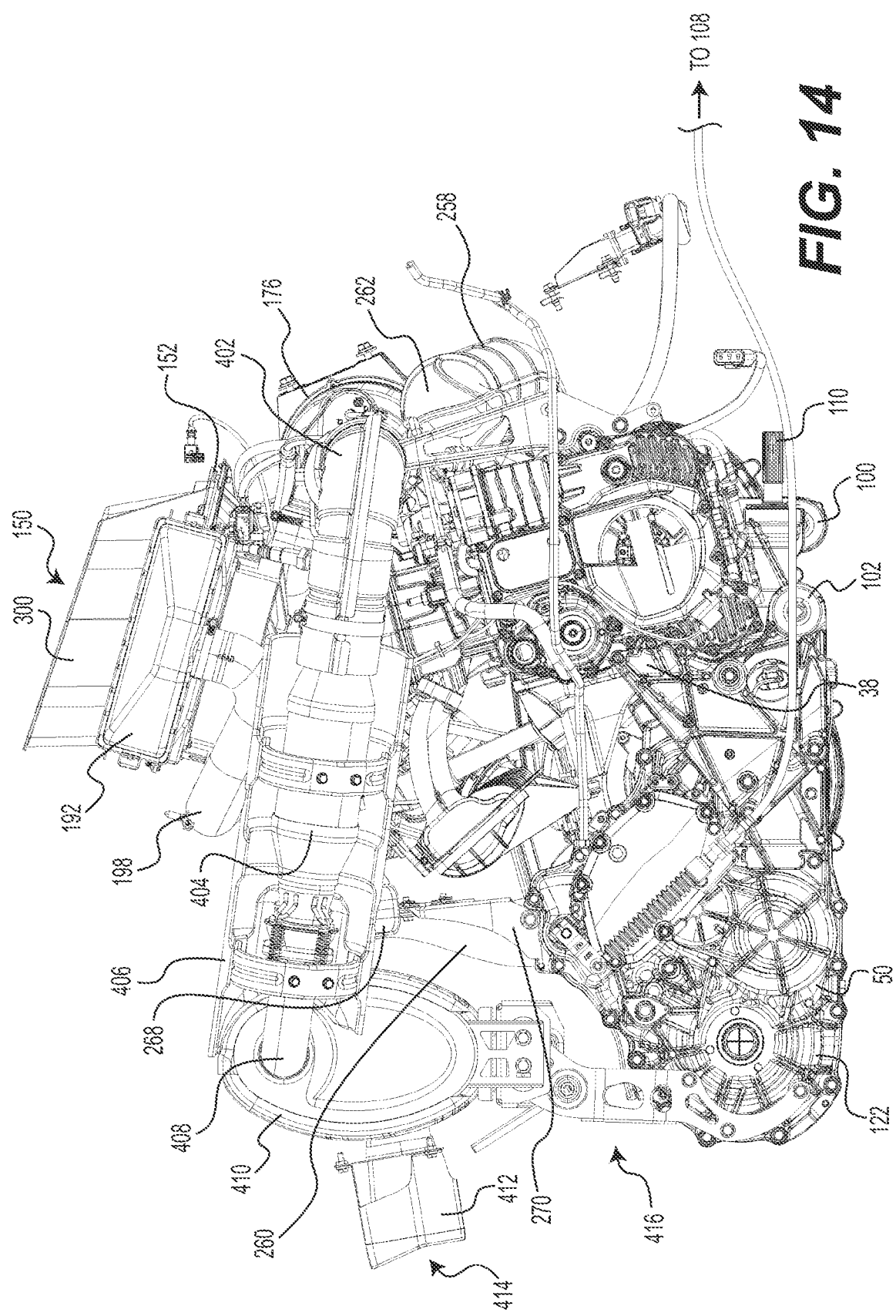
FIG. 14 is a right side elevation view of the engine, air intake system and exhaust system of the vehicle of FIG. 1, with some components removed for clarity.
Figure 16:
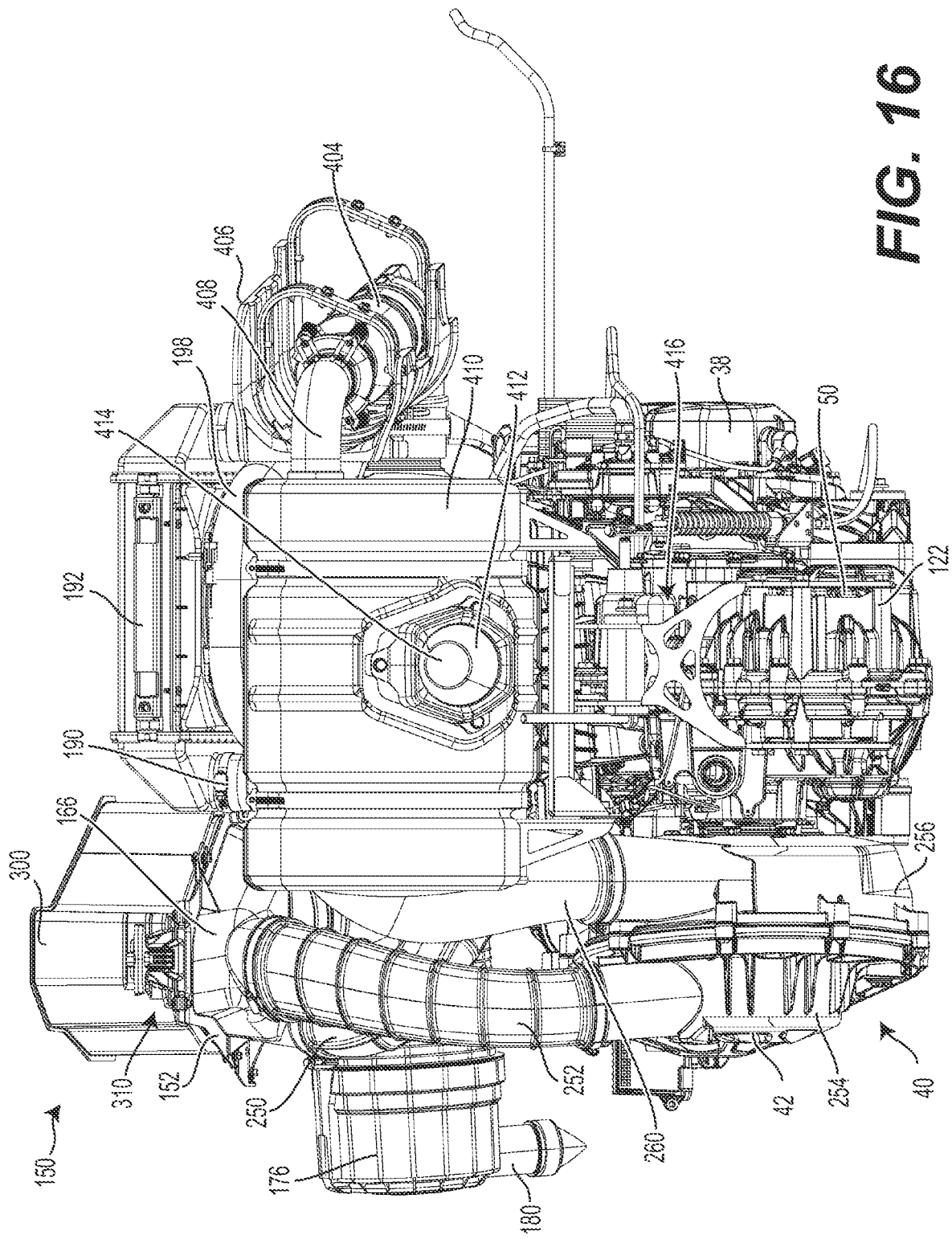
FIG. 16 is a rear elevation view of the components of FIG. 14.
Figure 17:
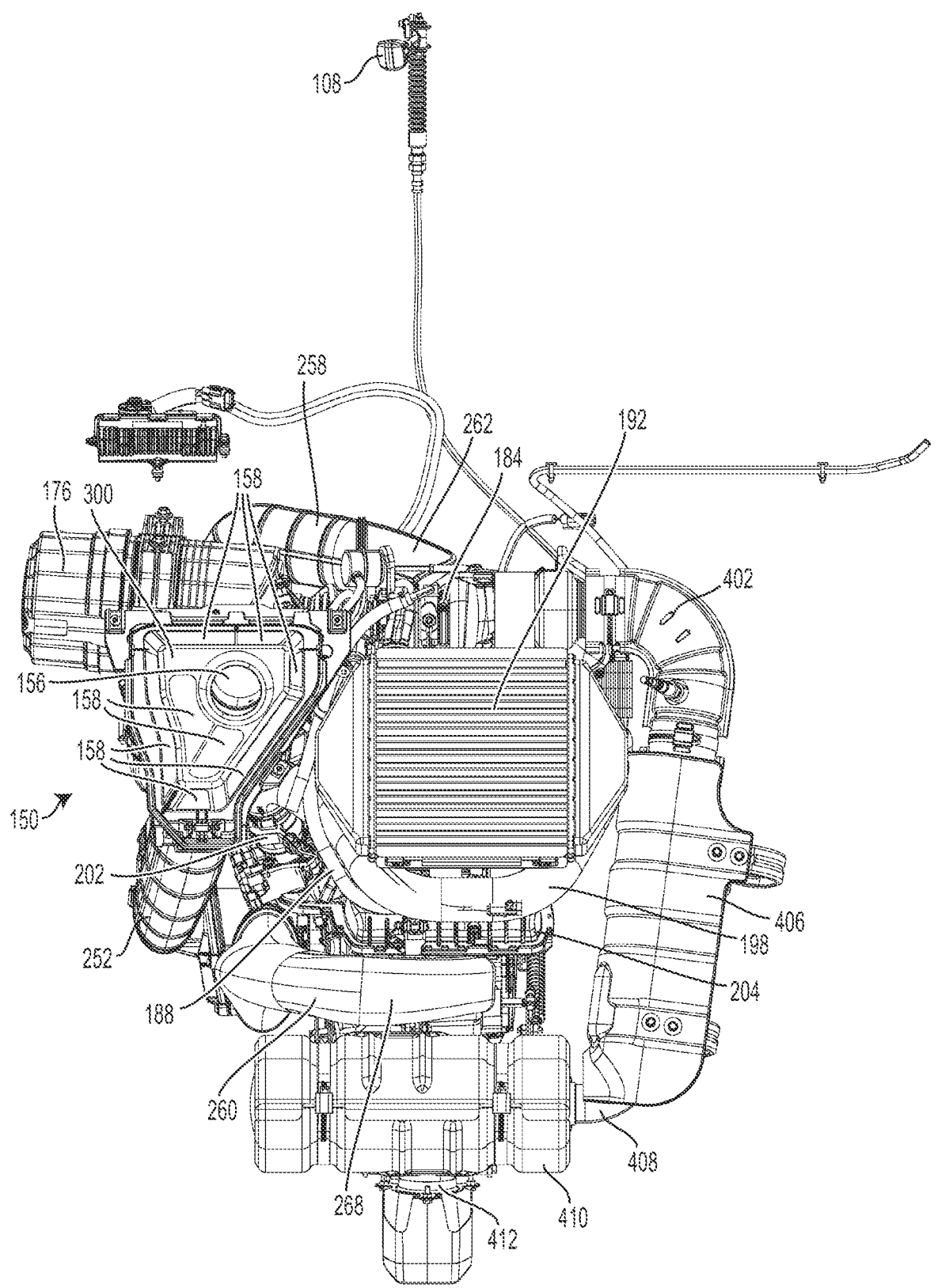
FIG. 17 is a top plan view of the components of FIG. 14.

Turning now to FIGS. 10 and 14 to 17, the exhaust system of the vehicle 10 will be described. Exhaust gases from the combustion chambers of the engine 38 enter the exhaust system via an exhaust manifold 400 (FIG. 15) connected to the front of the cylinders of the engine 38. From the exhaust manifold 400, the exhaust gases flow to the turbocharger 184 to drive the turbine of the turbocharger 184. From the turbocharger 184, the exhaust gases flow in an exhaust pipe 402 that first extends to the right and then rearward. From the exhaust pipe 402, the exhaust gases flow rearward and upward through an expansion chamber 404. It is contemplated that the expansion chamber 404 could house a catalytic converter. The expansion chamber 404 is disposed inside a heat shield 406, a portion of which is removed in the figures to show the expansion chamber 404. Air flowing out of the CVT outlet conduit 260 flows over the heat shield 406 as would be understood from FIG. 14. From the expansion chamber 404, the exhaust gases flow in an exhaust pipe 408 that first extends rearward and then left into a muffler 410. From the muffler 410, the exhaust gases flow in an exhaust pipe 412 extending from the rear side of the muffler 410. The exhaust pipe 412 is laterally centered on the vehicle 10. The exhaust pipe 412 defines the rearward facing exhaust outlet 414 through which the exhaust gases flow to the atmosphere. The muffler 410 is connected to the transaxle 50 via brackets 416 as best seen in FIGS. 14 and 16.

The vehicle 10 implemented in accordance with some non-limiting implementations of the present technology can be represented as presented in the following numbered clauses.

CLAUSE 1: A vehicle comprising: a frame; at least one ground engaging member operatively connected to the frame; an internal combustion engine connected to the frame; a continuously variable transmission (CVT) having: a CVT housing; a primary pulley housed in the CVT housing and operatively connected to the engine; a secondary pulley housed in the CVT housing and operatively connected to at least one of the at least one ground engaging member; and a belt housed in the CVT housing and looped around the primary and secondary pulleys to transfer torque between the primary and secondary pulleys; and an air intake assembly having at least one air intake assembly inlet, at least one first air intake assembly aperture and at least one second air intake assembly aperture, the at least one first air intake assembly aperture fluidly communicating with at least one air intake port of the engine, the at least one second air intake assembly aperture fluidly communicating with an interior of the CVT housing, a portion of air entering the air intake assembly via the at least one air intake assembly inlet flowing out of the air intake assembly via the at least one first air intake assembly aperture and then flowing to the at least one air intake port of the engine, and another portion of air entering the air intake assembly via the at least one air intake assembly inlet flowing out of the air intake assembly via the at least one second air intake assembly aperture and then flowing to the interior of the CVT housing.

CLAUSE 2: The vehicle of clause 1, further comprising at least one CVT inlet conduit fluidly communicating the at least one second air intake assembly aperture with the interior of the CVT housing.

CLAUSE 3: The vehicle of clause 2, wherein: the at least one CVT inlet conduit is two CVT inlet conduits; an outlet of one of the two CVT inlet conduits is disposed closer to the primary pulley than to the secondary pulley; and an outlet of another one of the two CVT inlet conduits is disposed closer to the secondary pulley than to the primary pulley.

CLAUSE 4: The vehicle of clause 3, wherein: the CVT housing includes a first portion and a second portion, the first portion being separable from the second portion; the outlet of the one of the two CVT inlet conduits is disposed in the first portion; and the outlet of the other one of the two CVT inlet conduits is disposed in the second portion.

CLAUSE 5: The vehicle of any one of clauses 1 to 3, further comprising at least one CVT outlet conduit fluidly communicating the interior of the CVT housing with the atmosphere.

CLAUSE 6: The vehicle of clause 5, wherein: the at least one CVT outlet conduit is two CVT outlet conduits; an inlet of one of the two CVT outlet conduits is disposed closer to the primary pulley than to the secondary pulley; and an inlet of another one of the two CVT outlet conduits is disposed closer to the secondary pulley than to the primary pulley.

CLAUSE 7: The vehicle of clause 5 or 6, further comprising an exhaust system fluidly connected to an exhaust port of the engine; and wherein the at least one CVT outlet conduit is oriented to direct air flowing out of the CVT housing via the at least one CVT outlet conduit over a portion of the exhaust system.

CLAUSE 8: The vehicle of any one of clauses 5 to 7, further comprising a turbocharger fluidly connected between the at least one first air intake assembly aperture and the at least one air intake port of the engine; and wherein the at least one CVT outlet conduit is oriented to direct air flowing out of the CVT housing via the at least one CVT outlet conduit over a portion of the turbocharger.

CLAUSE 9: The vehicle of any one of clauses 1 to 9, further comprising a turbocharger fluidly connected between the at least one first air intake assembly aperture and the at least one air intake port of the engine.

CLAUSE 10: The vehicle of clause 9, further comprising an air filter fluidly connected between the at least one first air intake assembly aperture and the turbocharger.

CLAUSE 11: The vehicle of clause 10, further comprising a blow-by gas tube fluidly communicating the engine with a conduit fluidly communicating the air filter with the turbocharger.

CLAUSE 12: The vehicle of any on of clauses 9 to 11, further comprising an intercooler fluidly communicating with the turbocharger for receiving pressurized air from the turbocharger, the intercooler fluidly communicating with the engine for supplying air to the engine.

CLAUSE 13: The vehicle of clause 12, further comprising a base disposed above the engine; wherein the intercooler and the air intake assembly are mounted to the base.

CLAUSE 14: The vehicle of any one of clauses 1 to 13, further comprising a base disposed above the engine; wherein the air intake assembly is mounted to the base.

CLAUSE 15: The vehicle of clause 14, wherein the air intake assembly is removable from the base; wherein the air intake assembly defines a space and a third air intake assembly aperture below the base; and the vehicle further comprises a compressible bellows disposed in the space and connected between the at least one first air intake assembly aperture and the third air intake assembly aperture.

CLAUSE 16: The vehicle of any one of clauses 1 to 15, wherein the air intake assembly includes: a filter housing defining the at least one first air intake assembly aperture and the at least one second air intake assembly aperture; a cover disposed over and being at least partially spaced from a top of the filter housing, the cover extending down over at least one of a side of the filter housing; and the at least one air intake assembly inlet is defined at least in part between the filter housing and the cover.

CLAUSE 17: The vehicle of any one of clauses 1 to 16, further comprising at least one screen filter disposed in the air intake assembly and connected to the at least one second air intake assembly aperture for filtering air entering the at least one second air intake assembly aperture.

CLAUSE 18: The vehicle of any one of clauses 1 to 17, further comprising a seat connected to the frame; and wherein: the seat has a seat bottom, a seat back and a headrest; and the at least one air intake assembly inlet is disposed rearward of the headrest and is at least partially aligned laterally and vertically with the headrest.

CLAUSE 19: A vehicle comprising: a frame; a seat connected to the frame, the seat having a seat bottom, a seat back and a headrest; at least one ground engaging member operatively connected to the frame; an internal combustion engine connected to the frame, the internal combustion engine being operatively connected to at least one of the at least one ground engaging member; and an air intake assembly having at least one air intake assembly inlet and at least one air intake assembly aperture, the at least one air intake assembly aperture fluidly communicating with at least one air intake port of the engine, the at least one air intake assembly inlet being disposed rearward of the headrest and being at least partially aligned laterally and vertically with the headrest.

CLAUSE 20: The vehicle of clause 19, wherein the at least one air intake assembly inlet faces generally forward.

CLAUSE 21: The vehicle of clause 19 or 20, wherein the seat is a driver seat; and the vehicle further comprises: a passenger seat connected to the frame, the passenger seat having a seat bottom, a seat back and a headrest, the driver and passenger seats being disposed laterally next to each other, the seat backs of the driver and passenger seats defining a space therebetween; and an intercooler fluidly communicating the at least one air intake assembly aperture with the engine, the intercooler being disposed rearward of the driver and passenger seats, and the intercooler being at least partially aligned laterally with the space defined between the seat backs of the driver and passenger seats.

CLAUSE 22: The vehicle of clause 21, further comprising a base disposed above the engine; wherein the intercooler and the air intake assembly are mounted to the base.

CLAUSE 23: A filter housing comprising: a first aperture; a tube connected to and extending from the first aperture; at least one second aperture; and at least one filter connected to the at least one second aperture for filtering air entering the at least one second aperture, a portion of air entering the filter housing flowing out of the filter housing via the first aperture and through the tube, and another portion of air entering the filter housing flowing out of the filter housing via the at least one second aperture around the tube separately from the portion of air flowing out of the filter housing via the first aperture.

CLAUSE 24: The filter housing of clause 23, further comprising a central raised portion; wherein the first aperture and the at least one second aperture are defined in the raised portion; and wherein the tube extends inside the raised portion.

CLAUSE 25: The filter housing of clause 23 or 24, further comprising: a floor extending from a bottom of the central raised portion; and a vertical wall extending from the floor along three sides of the central raised portion, the floor being disposed between the central raised portion and the vertical wall.

CLAUSE 26: The filter housing of clause 25, further comprising a seal connected to a bottom of the floor.

CLAUSE 27: The filter housing of clause 25 or 26, further comprising drain apertures defined in a bottom of the vertical wall.

CLAUSE 28: The filter housing of any one of clauses 23 to 27, further comprising a latch.

CLAUSE 29: The filter housing of any one clauses 23 to 28, further comprising a grating provided over the first aperture.

CLAUSE 30: The filter housing of any one of clauses 23 to 29, wherein the at least one second aperture includes: two second apertures defined in a top of the central raised portion; and six air intake assembly apertures defined in sides, front and back of the central raised portion.

CLAUSE 31: The filter housing of any one of clauses 23 to 30, wherein the at least one filter is a screen filter.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A filter housing comprising:
a central raised portion;
a floor extending from a bottom of the central raised portion; and
a vertical wall extending from the floor along three sides of the central raised portion, the floor being disposed between the central raised portion and the vertical wall;
a first aperture defined in the raised portion;
a tube connected to and extending inside the raised portion from the first aperture;
at least one second aperture defined in the raised portion; and
at least one filter connected to the at least one second aperture for filtering air entering the at least one second aperture;
a portion of air entering the filter housing flowing out of the filter housing via the first aperture and through the tube, and
another portion of air entering the filter housing flowing out of the filter housing via the at least one second aperture around the tube and over an exterior surface of the tube separately from the portion of air flowing out of the filter housing via the first aperture.

2. The filter housing of claim 1, further comprising a seal connected to a bottom of the floor.

3. The filter housing of claim 1, further comprising drain apertures defined in a bottom of the vertical wall.

4. A filter housing comprising:
a central raised portion;
a first aperture defined in the raised portion;
a tube connected to and extending inside the raised portion from the first aperture;
at least one second aperture defined in the raised portion; and
at least one filter connected to the at least one second aperture for filtering air entering the at least one second aperture;
a portion of air entering the filter housing flowing out of the filter housing via the first aperture and through the tube, and
another portion of air entering the filter housing flowing out of the filter housing via the at least one second aperture around the tube and over an exterior surface of the tube separately from the portion of air flowing out of the filter housing via the first aperture,
the at least one second aperture including:
two second apertures defined in a top of the central raised portion; and six air intake assembly apertures defined in sides, front and back of the central raised portion.

5. A filter housing comprising:
a first aperture;
a tube connected to and extending from the first aperture;
at least one second aperture; and
at least one filter connected to the at least one second aperture for filtering air entering the at least one second aperture,
a portion of air entering the filter housing flowing out of the filter housing via the first aperture and through the tube, the portion of air not flowing through the at least one filter; and
another portion of air entering the filter housing flowing out of the filter housing via the at least one second aperture around the tube and over an exterior surface of the tube separately from the portion of air flowing out of the filter housing via the first aperture, the other portion of air flowing through the at least one filter.

6. The filter housing of claim 5, further comprising a central raised portion;
wherein the first aperture and the at least one second aperture are defined in the raised portion; and
wherein the tube extends inside the raised portion.

7. The filter housing of claim 6, further comprising:
a floor extending from a bottom of the central raised portion; and
a vertical wall extending from the floor along three sides of the central raised portion, the floor being disposed between the central raised portion and the vertical wall.

8. The filter housing of claim 7, further comprising a seal connected to a bottom of the floor.

9. The filter housing of claim 7, further comprising drain apertures defined in a bottom of the vertical wall.

10. The filter housing of claim 6, wherein the at least one second aperture includes:
two second apertures defined in a top of the central raised portion; and
six air intake assembly apertures defined in sides, front and back of the central raised portion.

11. The filter housing of claim 5, further comprising a latch.

12. The filter housing of claim 5, further comprising a grating provided over the first aperture.

13. The filter housing of claim 5, wherein the at least one filter is a screen filter.

14. The filter housing of claim 5, wherein the at least one second aperture surrounds the first aperture.

15. The filter housing of claim 5, wherein the at least one filter is removable.

16. The filter housing of claim 5, wherein:
the at least one filter is at least one second filter; and
the filter housing further comprises at least one first filter connected to the first aperture for filtering air entering the first aperture.

17. The filter housing of claim 16, wherein the at least one first filter is removable.

18. A vehicle comprising the filter housing of claim 5.

19. The vehicle of claim 18, further comprising:
an internal combustion engine;
a continuously variable transmission (CVT) operatively connected to the internal combustion engine;
wherein:
the first aperture supplies air to one of:
at least one air intake port of the engine; and
an interior of a housing of the CVT; and
the at least one second aperture supplies air to another one of:
at least one air intake port of the engine; and
an interior of a housing of the CVT.

20. The vehicle of claim 19, wherein:
the first aperture supplies air to the at least one air intake port of the engine; and
the at least one second aperture supplies air to the interior of the housing of the CVT.

* * * * *